US012570084B2

(12) United States Patent
Yoshida et al.

(10) Patent No.: US 12,570,084 B2
(45) Date of Patent: Mar. 10, 2026

(54) SHEET LAMINATOR AND IMAGE FORMING SYSTEM INCORPORATING THE SHEET LAMINATOR

(71) Applicants: Naohiro Yoshida, Kanagawa (JP);
Ryohsuke Akaishi, Kanagawa (JP);
Yasunobu Kidoura, Kanagawa (JP);
Hirofumi Horita, Kanagawa (JP);
Satoshi Kuno, Tokyo (JP)

(72) Inventors: Naohiro Yoshida, Kanagawa (JP);
Ryohsuke Akaishi, Kanagawa (JP);
Yasunobu Kidoura, Kanagawa (JP);
Hirofumi Horita, Kanagawa (JP);
Satoshi Kuno, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 94 days.

(21) Appl. No.: 18/731,872

(22) Filed: Jun. 3, 2024

(65) Prior Publication Data

US 2024/0399732 A1     Dec. 5, 2024

(30) Foreign Application Priority Data

Jun. 5, 2023     (JP) ................................. 2023-092303
Apr. 2, 2024     (JP) ................................. 2024-059609

(51) Int. Cl.
B32B 38/18          (2006.01)
B32B 37/10          (2006.01)
(Continued)

(52) U.S. Cl.
CPC .............. B32B 38/18 (2013.01); B32B 37/10 (2013.01); B32B 37/185 (2013.01);
(Continued)

(58) Field of Classification Search
CPC .......... B32B 2309/14; B32B 2309/105; B32B 2309/04; B32B 2309/02; B32B 41/00;
(Continued)

(56) References Cited

U.S. PATENT DOCUMENTS

2001/0054486 A1* 12/2001 Botta .................... B32B 37/185
                                                    156/555
2022/0169458 A1*  6/2022 Suzuki .................. B32B 37/185
(Continued)

FOREIGN PATENT DOCUMENTS

JP          2012121728 A      6/2012
JP          2018203478 A     12/2018

*Primary Examiner* — Vishal I Patel
(74) *Attorney, Agent, or Firm* — Harness, Dickey & Pierce, P.L.C.

(57)          ABSTRACT

A sheet laminator includes a sheet ejection roller pair, a sheet ejection tray, a presser, and circuitry. The sheet ejection tray has a receiving face to receive the two-ply sheet standing in the sheet ejection tray, and a stacking face facing the receiving face and inclined with respect to the vertical direction. The presser has a leading end to move the two-ply sheet on the receiving face toward the stacking face, and press the two-ply sheet onto the stacking face. The circuitry is to perform a first operation to move the leading end of the presser from the receiving face to an intermediate position beyond the extension line and before the stacking face, perform a second operation to move the leading end of the presser from the intermediate position to the stacking face, and press the two-ply sheet against the stacking face with the leading end of the presser.

15 Claims, 32 Drawing Sheets

(51) Int. Cl.
 *B32B 37/18* (2006.01)
 *B32B 38/00* (2006.01)
 *B32B 41/00* (2006.01)

(52) U.S. Cl.
 CPC ............ *B32B 38/145* (2013.01); *B32B 41/00*
 (2013.01); *B32B 2309/02* (2013.01); *B32B*
 *2309/04* (2013.01); *B32B 2309/105* (2013.01);
 *B32B 2309/14* (2013.01)

(58) Field of Classification Search
 CPC ..... B32B 38/145; B32B 37/185; B32B 37/10;
 B32B 38/18
 See application file for complete search history.

(56) References Cited

U.S. PATENT DOCUMENTS

| | | | |
|---|---|---|---|
| 2022/0334523 A1* | 10/2022 | Akiyama | B32B 37/0015 |
| 2023/0244164 A1 | 8/2023 | Kidoura et al. | |
| 2023/0256726 A1 | 8/2023 | Kunieda et al. | |
| 2023/0264461 A1 | 8/2023 | Kuno et al. | |
| 2023/0264491 A1 | 8/2023 | Horita et al. | |
| 2023/0264909 A1 | 8/2023 | Kawakami et al. | |
| 2023/0303352 A1 | 9/2023 | Akaishi et al. | |

* cited by examiner

FIG. 9

FIG. 14A
VIEW ON
ARROW Z
VIEW ON
ARROW Y
VIEW ON
ARROW X
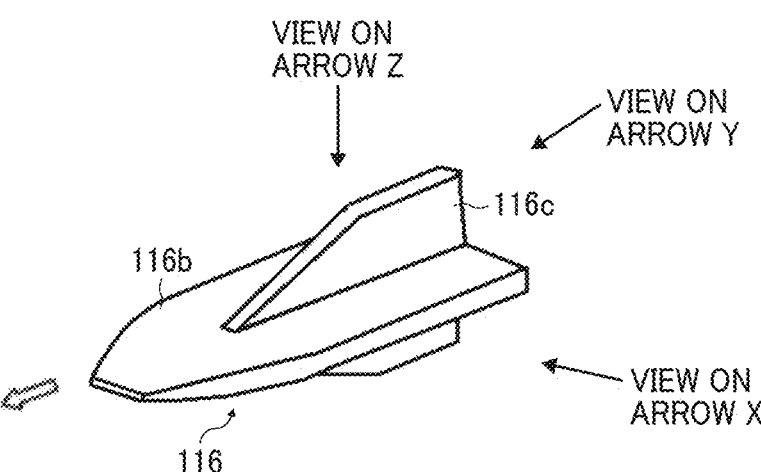
116c
116b
116
FIG. 14B
VIEW ON
ARROW Z
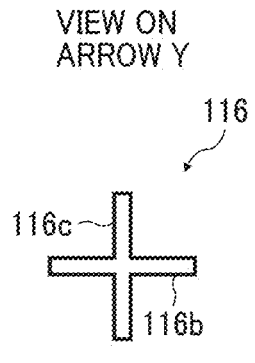
116
116b
116c
116b1
FIG. 14C
VIEW ON
ARROW Y
116
116c
116b
FIG. 14D
VIEW ON
ARROW X
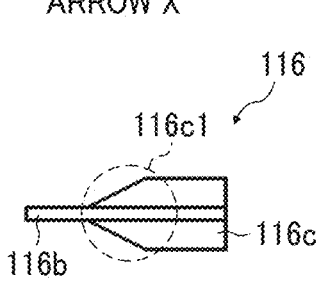
116
116c1
116c
116b

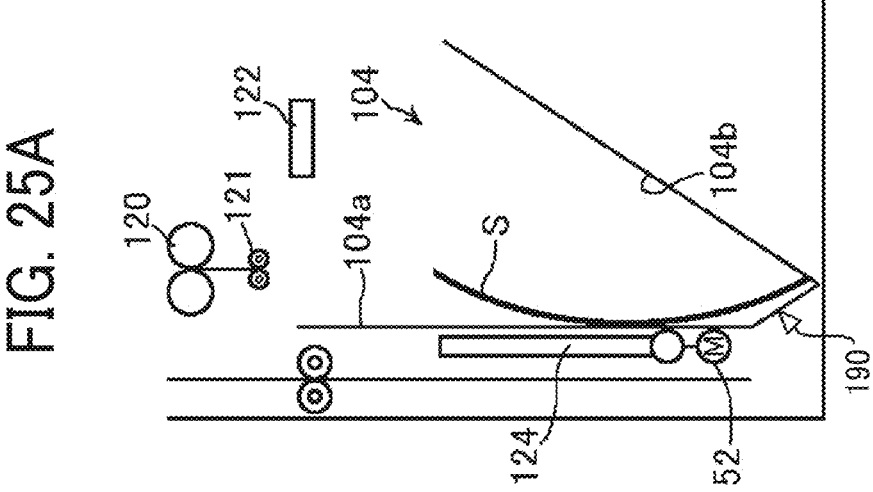

START

EJECT SHEET S FROM EJECTION ROLLER PAIR — S301

START DRIVING PRESSING MEMBER — S302

DETECT THAT LEADING END OF PRESSING MEMBER REACHES FIRST POSITION BEYOND NIP EXTENSION LINE OF EJECTION ROLLER — S303

STOP DRIVING PRESSING MEMBER — S304

Figure 36:
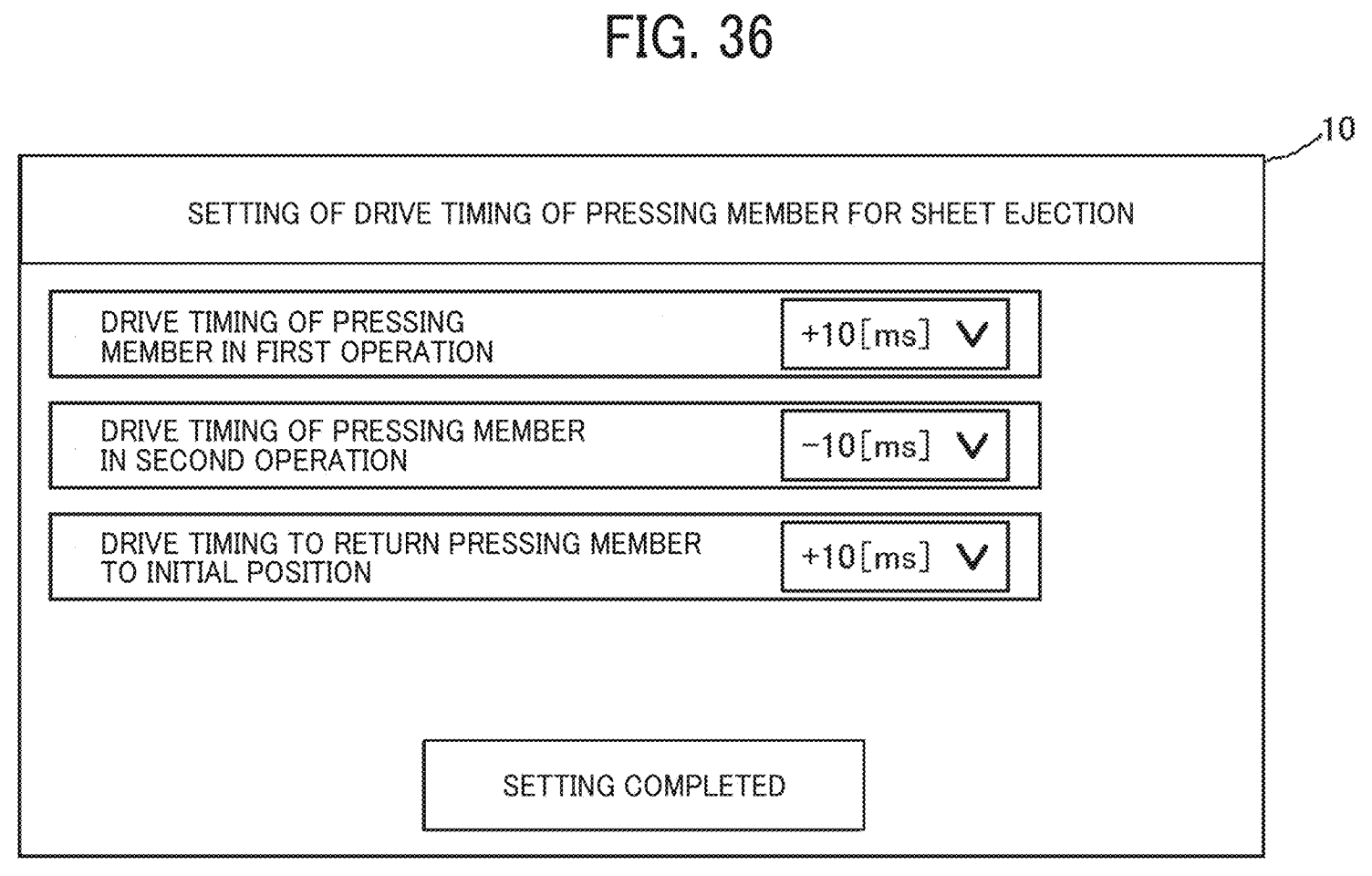

SETTING OF DRIVE TIMING OF PRESSING MEMBER FOR SHEET EJECTION

DRIVE TIMING OF PRESSING
MEMBER IN FIRST OPERATION　　+10[ms] ∨

DRIVE TIMING OF PRESSING MEMBER
IN SECOND OPERATION　　−10[ms] ∨

DRIVE TIMING TO RETURN PRESSING MEMBER
TO INITIAL POSITION　　+10[ms] ∨

SETTING COMPLETED

10

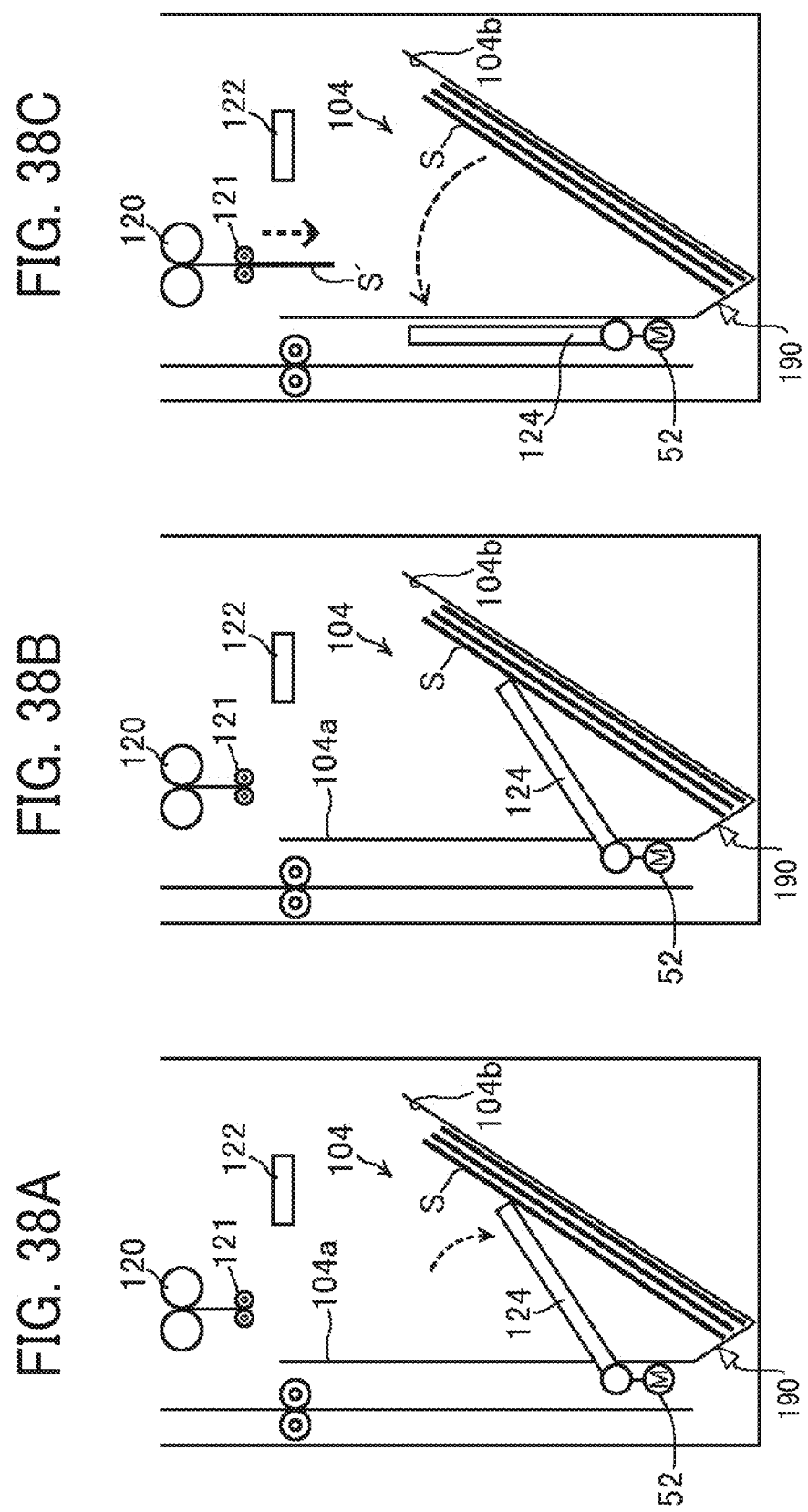

SHEET LAMINATOR AND IMAGE FORMING SYSTEM INCORPORATING THE SHEET LAMINATOR

CROSS-REFERENCE TO RELATED APPLICATIONS

This patent application is based on and claims priority pursuant to 35 U.S.C. § 119(a) to Japanese Patent Application Nos. 2023-092303, filed on Jun. 5, 2023, and 2024-059609, filed on Apr. 2, 2024, in the Japan Patent Office, the entire disclosure of each of which is hereby incorporated by reference herein.

BACKGROUND

Technical Field

Embodiments of the present disclosure relate to a sheet laminator and an image forming system incorporating the sheet laminator.

Background Art

Lamination technologies are known in the art that insert an inner sheet (e.g., paper or photo) between a two-ply sheet (e.g., a lamination sheet or a lamination film) and apply heat and pressure to the two-ply lamination sheet to bond the two-ply sheet. The two-ply lamination sheet is made of two sheets (plies) bonded (sealed) on one side as if one sheet is folded.

In addition, sheet laminators are known that eject a two-ply sheet subjected to sheet lamination downstream in the vertical direction by a sheet ejection roller pair and stack the two-ply sheet on a sheet ejection tray by pressing the sheet against an oblique side face by a presser. Due to such a configuration, the two-ply sheet with heat is prevented from being curved (curled) due to the weight of the two-ply sheet and is stacked on the sheet ejection tray.

A sheet laminator in the related art includes a vertical stack type sheet ejection tray to which two-ply sheets are downwardly ejected and pressed by the presser on the tray.

However, such a sheet laminator in the related art may leave a pressing mark (recessed mark) on the two-ply sheet subjected to sheet lamination since the glue applied between the two sheets of the two-ply sheet is not completely cured to fix the two sheets when the two-ply sheet is pressed against the sheet ejection tray by the presser immediately after the sheet lamination is performed on the two-ply sheet. On the other hand, if the pressing timing is too late, the two-ply sheet in the vertical stack state may be curled due to the weight of the two-ply sheet.

SUMMARY

Embodiments of the present disclosure described herein provide a novel sheet laminator including a sheet ejection roller pair, a sheet ejection tray, a presser, and circuitry. The sheet ejection roller pair ejects a two-ply sheet downwardly along an extension line in a vertical direction, the two-ply sheet subjected to a sheet laminating operation in which heat and pressure are applied to the two-ply sheet with a sheet medium. The sheet ejection tray is disposed downstream from the sheet ejection roller pair in the vertical direction. The sheet ejection tray has a receiving face and a stacking face. The receiving face receives the two-ply sheet ejected from the sheet ejection roller pair and standing in the sheet ejection tray. The stacking face faces the receiving face and inclined with respect to the vertical direction. The presser has a leading end to move the two-ply sheet on the receiving face toward the stacking face, and press the two-ply sheet onto the stacking face. The circuitry is to perform a first operation to move the leading end of the presser from the receiving face to an intermediate position beyond the extension line and before the stacking face to stack the two-ply sheet on the stacking face, perform a second operation to move the leading end of the presser from the intermediate position to the stacking face, and press the two-ply sheet against the stacking face with the leading end of the presser.

Further, embodiments of the present disclosure described herein provide an image forming system including the above-described sheet laminator, and an image forming apparatus to form an image on an inner sheet to be conveyed to the sheet laminator.

BRIEF DESCRIPTION OF THE SEVERAL VIEWS OF THE DRAWINGS

Exemplary embodiments of this disclosure will be described in detail based on the following figures, wherein:

FIG. 9 is a diagram illustrating the main part of the sheet processing device in an operation subsequent to the operation illustrated in FIG. 8;

FIGS. 14A, 14B, 14C and 14D are schematic views of a separation member included in the sheet processing device;

FIG. 19 is a diagram illustrating an overall configuration of a sheet laminator according to an embodiment of the present disclosure, including the sheet processing device illustrated in FIG. 1;

Specifically, FIG. 24A is a schematic diagram illustrating the state at the start of a sheet ejecting operation of the sheet;

FIG. 24B is a schematic diagram illustrating the state during the sheet ejecting operation of the sheet;

FIG. 24C is a schematic diagram illustrating the state of completion of the sheet ejecting operation of the sheet;

FIG. 25A is a schematic diagram illustrating the state of the sheet in the sheet ejection tray when the sheet is curled;

FIG. 25B is a schematic diagram illustrating the state of the sheet in the sheet ejection tray when the sheet has a pressing trace;

FIGS. 26A, 26B and 26C are schematic diagrams each illustrating a first operation of a pressing member that moves the sheet on the receiving face of the sheet ejection tray to the stacking face of the sheet ejection tray;

FIGS. 27A and 27B are schematic diagrams each illustrating a second operation of the pressing member that presses the sheet to the stacking face of the sheet ejection tray;

FIG. 36 is a diagram illustrating an example of the control panel for setting a drive timing of the pressing member;

FIG. 38A is a schematic view of the pressing member in the state at the start of the second operation;

FIG. 38B is a schematic view of the pressing member in the state during (at the standby state of) the second operation; and FIG. 38C is a schematic view of the pressing member in the state at completion of the second operation.

Figure 1:
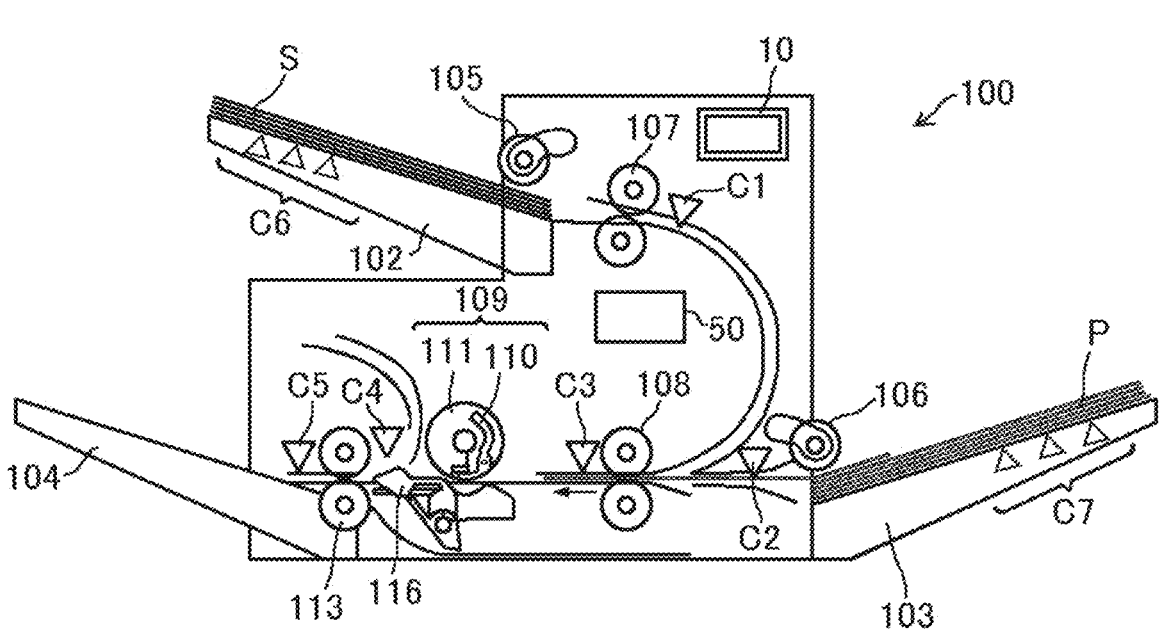
FIG. 1 is a schematic diagram illustrating an overall configuration of a sheet processing device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the present disclosure are described below in detail with reference to the drawings. In the drawings, the same or corresponding parts are denoted by the same reference numerals, and redundant description thereof are simplified or omitted as appropriate.

First, a description is given of a sheet processing device according to the present disclosure.

FIG. 1 is a schematic diagram illustrating the overall configuration of a sheet processing device according to an embodiment of the present disclosure.

A sheet processing device 100 according to the present embodiment separates two sheets (plies) of a two-ply sheet (hereinafter referred to as a "two-ply sheet S") to insert and nip a sheet-shaped medium (hereinafter referred to as an "inner sheet P") between the separated sheets of the two-ply sheet S.

The lamination sheet S is a two-ply sheet in which two sheets P1 and P2 are overlapped and bonded together at a portion (or a side) of the two-ply sheet. For example, a two-ply sheet has two sheets (two sides). A first side of the two-ply sheet serves as a transparent sheet such as a transparent polyester sheet, a second side of the two-ply sheet serves as a transparent or opaque sheet disposed facing the first side, and the first and second sides are bonded at one side of the two-ply sheet. The two-ply sheet also includes a lamination film.

The inner sheet P is an example of the sheet medium that is inserted into the two-ply sheet. The sheet medium may be, for example, thick paper, postcards, envelopes, plain paper, thin paper, coated paper, art paper, tracing paper, and overhead projector (OHP) transparencies.

As illustrated in FIG. 1, a sheet processing device 100 includes a sheet tray 102 as a first tray on which the lamination sheets S are placed, a pickup roller 105 that feeds the lamination sheet S from the sheet tray 102, and a conveyance roller pair 107. The sheet processing device 100 further includes a sheet tray 103 as a second tray on which the insertion sheet P is placed, and a pickup roller 106 that feeds the insertion sheet P from the sheet tray 103.

The sheet tray 102 includes a sheet size sensor C6 that serves as a sheet size detector to detect the size of the lamination sheet S, in other words, the length of the lamination sheet S in the sheet conveyance direction. The sheet tray 103 includes a sheet size sensor C7 that serves as a medium size detector to detect the size of the inner sheet P, in other words, the length of the inner sheet P in the sheet conveyance direction.

Each of the sheet size sensor C6 and the sheet size sensor C7 includes multiple sensors arranged side by side in the conveyance direction. Since the detection results of the sensors change depending on the size of the stacked lamination sheet S (or the insertion sheet P), the sheet size sensors C6 and C7 can detect the length of the lamination sheet S (or the insertion sheet P) in the conveyance direction.

A sheet conveyance sensor C1 is disposed downstream from the conveyance roller pair 107 in the sheet conveyance direction to detect the sheet conveyance position of the two-ply sheet S.

A sheet conveyance sensor C2 is disposed downstream from the pickup roller 106 in the sheet conveyance direction to detect the sheet conveyance position of the inner sheet P.

The sheet sensors C1 and C2 may be used to detect the length of the lamination sheet S (or the insertion sheets P) in the conveyance direction.

The sheet processing device 100 further includes an entrance roller pair 108 as a first conveyor, a winding roller 109 as a rotator, the exit roller pair 113 as a second conveyor, and the sheet ejection tray 104. The entrance roller pair 108, the winding roller 109, the exit roller pair 113, and the sheet ejection tray 104 are disposed downstream from the conveyance roller pair 107 and the pickup roller 106 in the sheet conveyance direction. The sheet processing device 100 further includes separation members 116 between the winding roller 109 and the exit roller pair 113. The separation members 116 are movable in the width direction of the sheet S.

A conveyance sensor C3 that detects the positions of a lamination sheet S and an inner sheet P being conveyed is disposed downstream from the entrance roller pair 108 in the sheet conveyance direction.

An abnormality detection sensor C4 that detects the state of the lamination sheet S is disposed downstream from the winding roller 109 (as a winder) in the sheet conveyance direction.

A conveyance sensor C5 that detects the position of the lamination sheet S being conveyed is disposed downstream from the exit roller pair 113 in the sheet conveyance direction.

The pickup roller 105, the conveyance roller pair 107, the entrance roller pair 108, and the winding roller 109 are examples of a first feeder. The pickup roller 106, the entrance roller pair 108 and the winding roller 109 are examples of a second feeder.

A control panel 10 is provided on the exterior of the sheet processing device 100. The control panel 10 serves as a display-operation device to display information of the sheet processing device 100 and receives input of the operation of the sheet processing device 100. The control panel 10 also serves as a notification device to output a perceptual signal to a user. As an alternative, a notification device other than the control panel 10 may be separately provided in the sheet processing device 100.

The sheet processing device 100 according to the present embodiment loads two-ply sheets S and inner sheets P on separate trays, which are the sheet trays 102 and 103. As a two-ply sheet S is conveyed in the sheet processing device 100, the sheet processing device 100 separates the two-ply sheet S into the two sheets P1 and P2. While the two sheets P1 and P2 separated from each other remain open at the non-bonding portion, the sheet processing device inserts the inner sheet P into an opening of the two-ply sheet S. The exit roller pair 113 ejects and stacks the lamination sheet S, in which the inner sheet P has been inserted, onto the sheet ejection tray 104.

Figure 2:
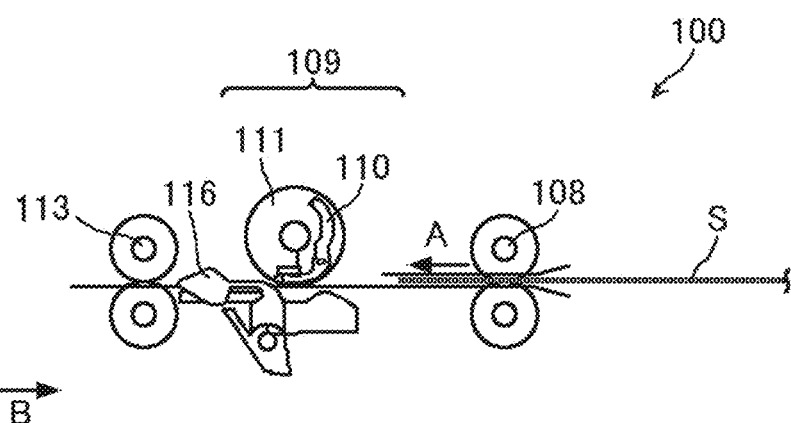
FIG. 2 is a diagram illustrating a main part of the sheet processing device of FIG. 1.

FIG. 2 is a schematic view illustrating a main part of the sheet processing device of FIG. 1.

As illustrated in FIG. 2, each of the entrance roller pair 108 and the exit roller pair 113 is, for example, two rollers paired with each other and driven by a driver such as a motor. The controller 550 causes the driver to control rotations of the entrance roller pair 108 and the exit roller pair 113. The entrance roller pair 108 is driven to rotate in one direction. The exit roller pair 113 rotates in forward and reverse directions, thereby nipping and conveying the lamination sheet S and the inner sheet P.

The entrance roller pair 108 conveys the lamination sheet S and the inner sheet P toward the exit roller pair 113.

The sheet conveyance direction indicated by arrow A in FIG. 2 is referred to as a forward conveyance direction or a sheet conveyance direction (direction A).

The exit roller pair 113 can switch the direction of rotation between the forward direction and the reverse direction. The exit roller pair 113 conveys the lamination sheet S nipped by the rollers of the exit roller pair 113 toward the sheet ejection tray 104 (see FIG. 1) in the forward conveyance direction and also conveys the lamination sheet S toward the winding roller 109 in the direction opposite the forward conveyance direction (to convey the lamination sheet S in reverse). The sheet conveyance direction toward the winding roller 109, which is indicated by arrow B in FIG. 4 and a direction opposite to the forward conveyance direction, is referred to as a reverse conveyance direction or a direction B.

The sheet processing device 100 is provided with the winding roller 109 as a rotator and the separation members 116 that are disposed between the entrance roller pair 108 and the exit roller pair 113. The winding roller 109 is driven by the driving device such as a motor to rotate in the forward direction and the reverse direction. The direction of rotation of the winding roller 109 is switchable between the forward direction (i.e., clockwise direction) and the reverse direction (i.e., counterclockwise direction).

The winding roller 109 includes a roller 111 and a movable sheet gripper 110 disposed on the roller 111 to grip the lamination sheet S. The sheet gripper 110 that is movable grips the leading end of the two-ply sheet S between the sheet gripper 110 and the roller 111. The sheet gripper 110 may be integrated with the outer circumference of the roller 111, or may be a separate component.

A description is now given of a series of operations performed in the sheet processing device 100, in other words, the operations from separating the lamination sheet S to inserting the inner sheet P into the lamination sheet S, with reference to FIGS. 1 to 13B.

FIGS. 3 to 9 and 11 to 13B are schematic diagrams illustrating a series of sheet separation performed by the sheet separation device 1.

Figure 10A:
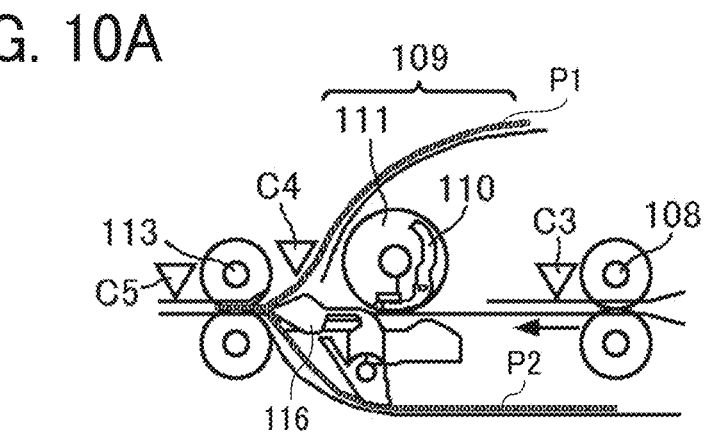
FIGS. 10A, 10B, and 10C are schematic views, each illustrating a sheet guide passage of the two sheets separated from the lamination sheet, according to a modification of the present disclosure.
Figure 10B:
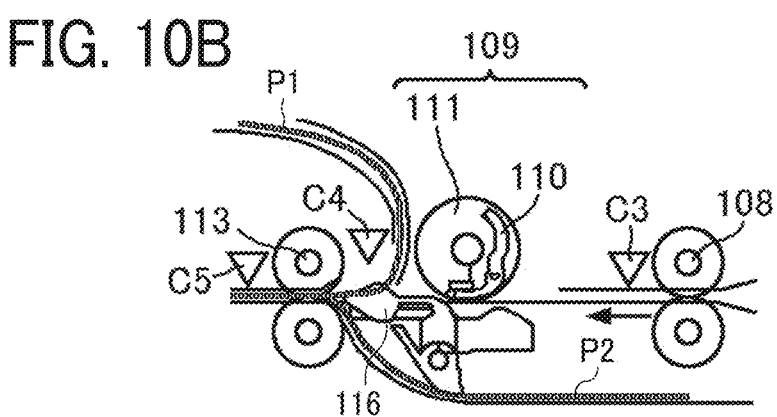
Figure 10C:
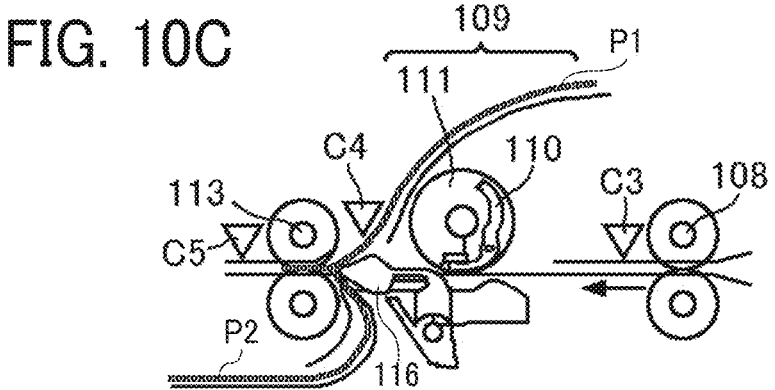

FIGS. 10A, 10B, and 10C are schematic views, each illustrating a sheet guide passage of the two sheets separated from the lamination sheet, according to a modification of the present disclosure.

The series of operations performed in the sheet processing device 100 indicates the operations from separating the lamination sheet S to inserting the inner sheet P into the lamination sheet S. In FIGS. 3 to 13B, elements identical to those illustrated in FIG. 1 or 2 are given identical reference numerals, and the descriptions thereof are omitted.

In FIG. 1, the lamination sheets S are stacked on the sheet tray 102 such that the bonding side on which the two sheets P1 and P2 are bonded is on the downstream side in the direction of feeding (that is, the conveyance direction) of the pickup roller 105. In the sheet processing device 100, the pickup roller 105 picks up the lamination sheet S from the sheet tray 102, and the conveyance roller pair 107 conveys the lamination sheet S toward the entrance roller pair 108.

As illustrated in FIG. 2, the entrance roller pair 108 conveys the lamination sheet S toward the winding roller 109. In the sheet processing device 100, the entrance roller pair 108 conveys the lamination sheet S with the bonded end, which is one of four sides of the lamination sheet S, as the downstream side in the forward conveyance direction A as indicated by arrow A in FIG. 2.

Figures 3, 4, 5:
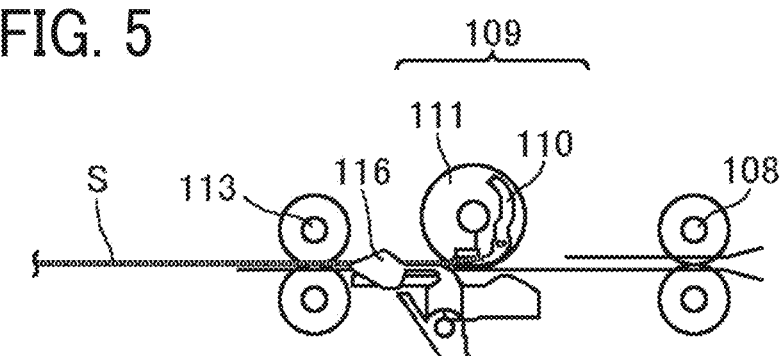
FIG. 3 is a diagram illustrating the main part of the sheet processing device in an operation subsequent to the operation illustrated in FIG. 2.
FIG. 4 is a diagram illustrating the main part of the sheet processing device in an operation subsequent to the operation illustrated in FIG. 3.
FIG. 5 is a diagram illustrating the main part of the sheet processing device in an operation subsequent to the operation illustrated in FIG. 4.

Subsequently, as illustrated in FIG. 3, the controller 500 of the sheet processing device 100 temporarily stops conveyance of the lamination sheet S when the trailing end of the lamination sheet S in the forward conveyance direction has passed the winding roller 109. Note that these operations are performed by conveying the lamination sheet S from the sheet sensor C3 by a specified amount in response to the timing at which the sheet sensor C3 detected the leading end of the lamination sheet S.

Next, as illustrated in FIG. 4, the controller 500 of the sheet processing device 100 causes the sheet gripper 110 to open and the exit roller pair 113 to rotate in the reverse direction to convey the lamination sheet S in the reverse conveyance direction (sheet conveyance direction B) toward the opened portion of the sheet gripper 110.

Subsequently, as illustrated in FIG. 5, the controller 500 of the sheet processing device 100 causes the exit roller pair 113 to stop rotating to stop conveyance of the lamination sheet S when the end of the lamination sheet S is inserted into the opened portion of the sheet gripper 110 and causes the driver to close the sheet gripper 110 to grip the end of the lamination sheet S. Note that these operations are performed when the lamination sheet S is conveyed by the specified amount.

Figure 6:
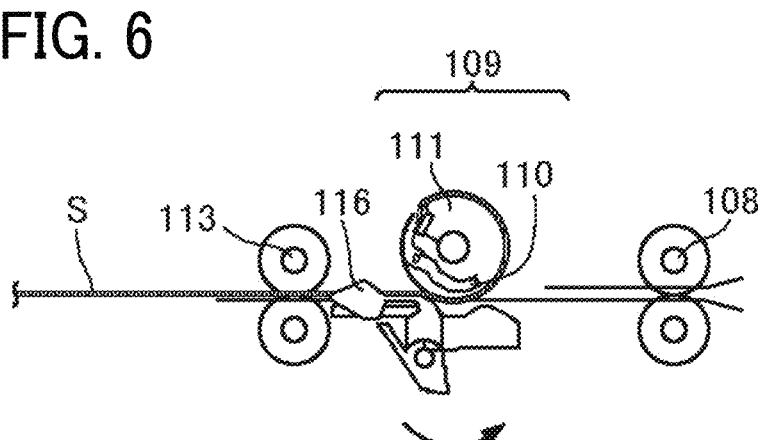
FIG. 6 is a diagram illustrating the main part of the sheet processing device in an operation subsequent to the operation illustrated in FIG. 5.

Then, as illustrated in FIG. 6, the controller 500 of the sheet processing device 100 causes the driver to rotate the winding roller 109 in the counterclockwise direction in FIG. 6 to wind the lamination sheet S around the winding roller 109. Here, the lamination sheet S is wound around the winding roller 109 from the side that is the non-bonding portion where the two sheets P1 and P2 of the lamination sheet S are overlapped but not bonded.

Figure 7:
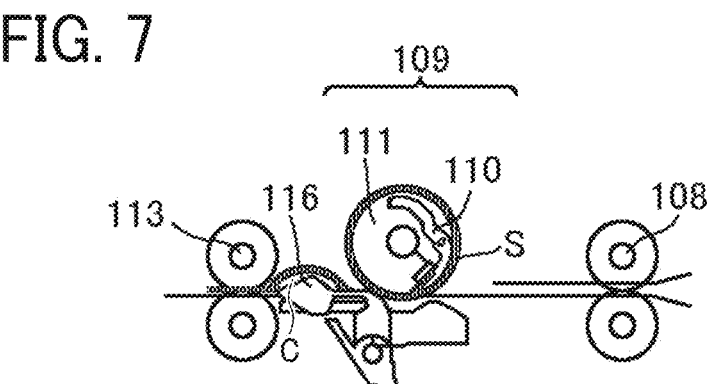
FIG. 7 is a diagram illustrating the main part of the sheet processing device in an operation subsequent to the operation illustrated in FIG. 6.

As illustrated in FIG. 7, when the lamination sheet S that is the two-ply sheet is wound around the winding roller 109, a winding circumferential length difference is created between the two sheets in the amount of winding of the lamination sheet S around the circumference of the winding roller 109. There is a surplus of the sheet on the inner circumferential side to the center of the winding roller 109, which generates a slack toward the bonded end. As a result, a space C is created between the two sheets P1 and P2 of the two-ply sheet. As the separation members 116 are inserted into the space C generated as described above, from both sides of the two-ply sheet S, the space C between the two sheets P1 and P2 is reliably maintained. These operations are performed by conveying the lamination sheet S from the sheet sensor C5 by a specified amount in response to the timing at which the sheet sensor C5 detected the leading end of the lamination sheet S.

The following describes the separation members 116.

FIGS. 14A, 14B, 14C and 14D are schematic views of the separation members 116 of the sheet processing device 100.

Figures 15A, 15B:
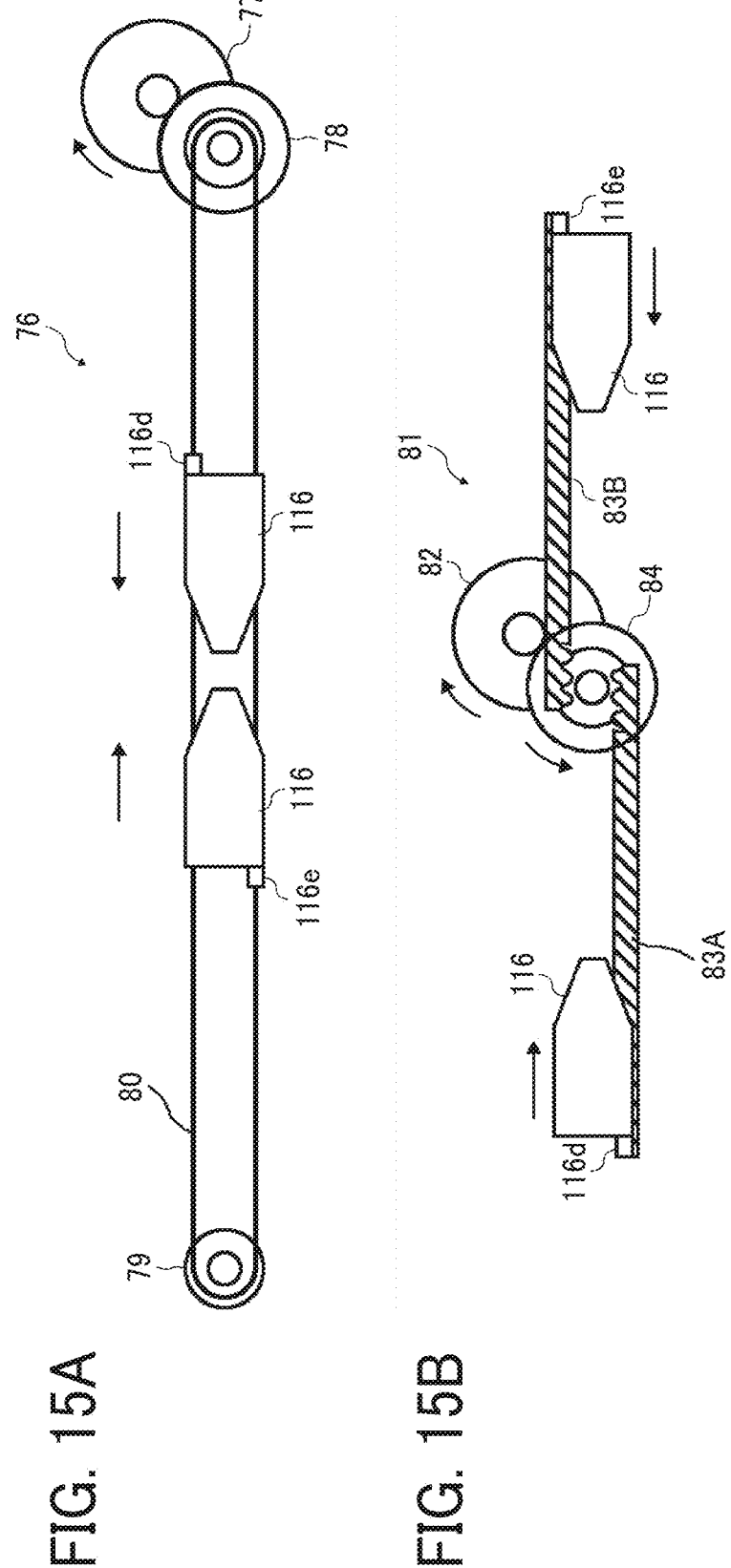
FIGS. 15A and 15B are schematic views of drive configurations of the separation members illustrated in FIGS. 14A, 14B, 14C and 14D.

FIGS. 15A and 15B are schematic views of an example of a drive configuration of the separation members 116.

Figure 16:
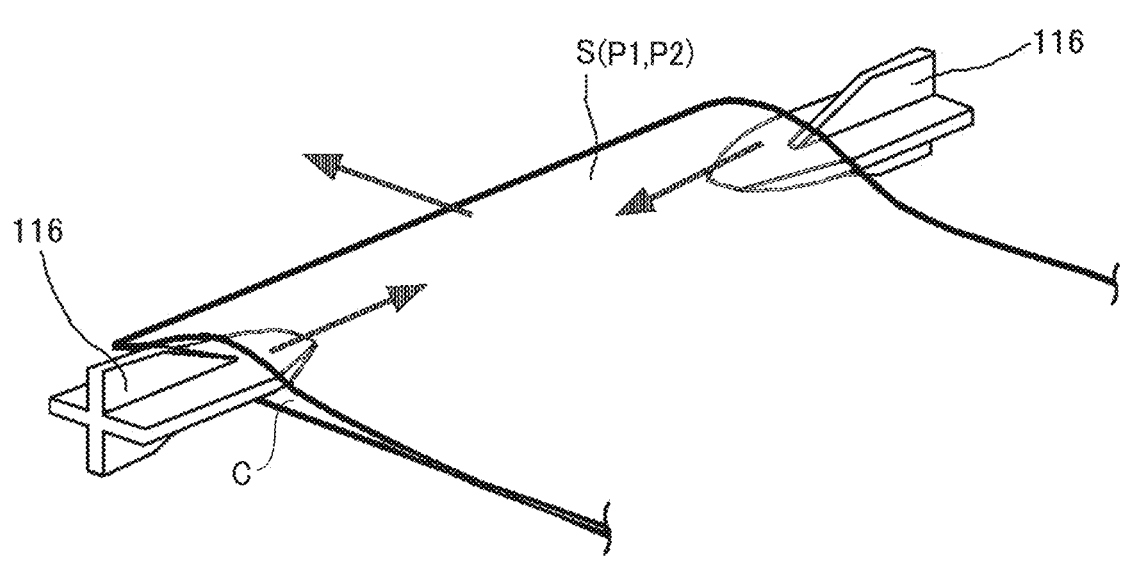
FIG. 16 is a perspective view of the separation members in a state in which the separation members are inserted into a sheet S.

Further, FIG. 16 is a perspective view of a state in which the separation members 116 are inserted in the lamination sheet S.

As illustrated in FIGS. 14A to 14D, the separation member 116 integrally includes a first plate 116b and a second plate 116c. The first plate 116b has a thickness in a thickness direction (plate thickness direction) that is substantially the same as the thickness direction of the lamination sheet S. The second plate 116c intersects with the first plate 116b in the thickness direction of the first plate 116b.

In other words, when viewed on arrow Y, the separation member 116 that moves in a direction indicated by a white arrow in FIG. 14A toward the space C of the lamination sheet S is viewed in substantially a cross shape by the first plate 116b extending in the left and right direction (the sheet conveyance direction of the lamination sheet S) and the second plate 116c extending in the vertical direction (the direction in which the space C is generated), as illustrated in FIG. 14C.

Figure 18:
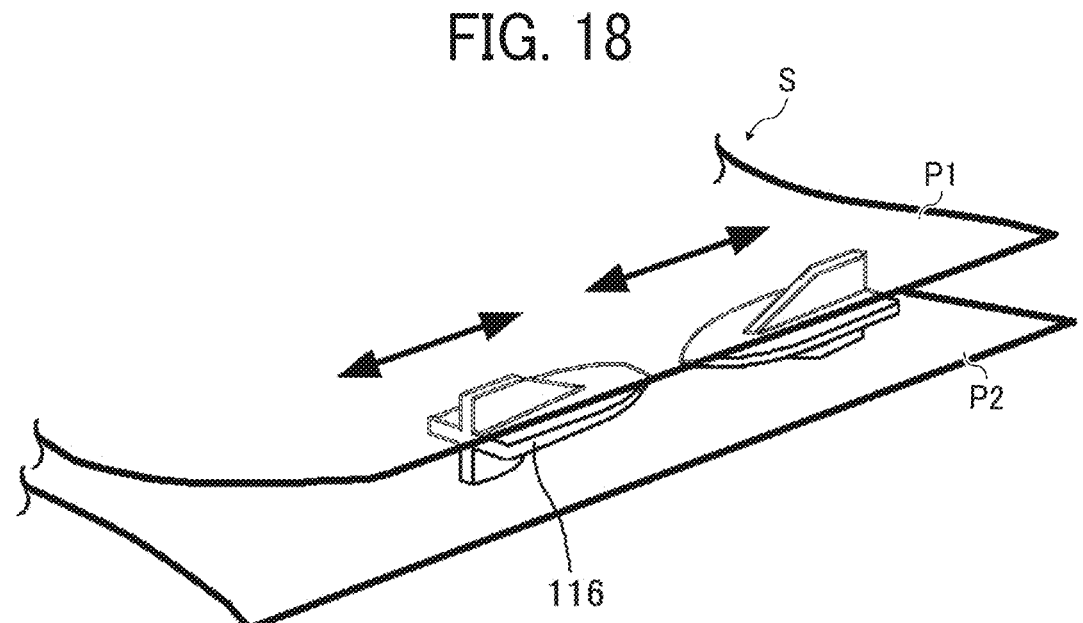
FIG. 18 is a perspective view of the separation members and the sheet S in another state illustrated in FIG. 8.

As described above, with the second plate 116c extending in the thickness direction (the direction in which the space C is generated), when the separation members 116 are inserted between the two sheets P1 and P2, as illustrated in FIG. 18, the gap between the two sheets P1 and P2 can be increased by at least the length of the second plate 116c in the vertical direction.

Further, as illustrated in FIG. 14D, the separation member 116 has a tapered portion 116c1. The tapered portion 116c1 has a thickness in substantially the same direction as the thickness direction of the lamination sheet S (the vertical direction). The thickness of the tapered portion 116c1 gradually increases from the center toward the outward side in the width direction of the lamination sheet S. Specifically, the tapered portion 116c1 whose length in the vertical direction gradually increases from the left toward the right in FIG. 14D is disposed at the end of the second plate 116c close to the center in the width direction of the lamination sheet S.

As described above, the second plate 116c (of the separation member 116) has the tapered portion 116c1. Due to such a configuration, as illustrated in FIG. 16, when the separation members 116 are inserted from the standby positions into the space C of the lamination sheet S, the separation members 116 are less likely to cause a failure in which at least one of the separation members 116 are caught by at least one of the two sheets P1 and P2. In other words, the separation members 116 are smoothly inserted into the space C of the lamination sheet S, and the two sheets P1 and P2 are separated from each other with a sufficient space by the second plate 116c.

Further, as illustrated in the drawings such as FIG. 14B, the separation member 116 has a tapered portion 116b1. The tapered portion 116b1 has a thickness in substantially the same direction as the sheet conveyance direction of the lamination sheet S (the left and right direction). The thickness of the tapered portion 116b1 gradually increases from the center toward the outward side in the width direction of the lamination sheet S. Specifically, as illustrated in FIG. 14B, the leading end of the tapered portion 116b1 in the left and right direction has substantially a V shape. As described above, the first plate 116b (of the separation member 116) has the tapered portion 116b1. Due to such a configuration, the separation members 116 increases the width of the space C and are smoothly inserted into the space C of the lamination sheet S, and the two sheets P1 and P2 are separated from each other.

Further, as illustrated in FIGS. 15A and 15B, in the present embodiment, two separation members 116 are disposed opposite to each other, so that the two separation members 116 contact and separate from each other. FIG. 15A illustrates a movement mechanism 76 that is used when the two separation members 116 contact and separate with respect to each other with a belt driving. Alternatively, FIG. 15B illustrates a movement mechanism 51 that is used when the two separation members 116 contact and separate with respect to each other with a rack and pinion mechanism.

As illustrated in FIG. 15A, the movement mechanism 76 for the separation members 116 includes, for example, a motor 77, a gear pulley 78, a pulley 79, and a timing belt 80. The gear pulley 78 includes, in steps, a gear that meshes with a motor gear mounted on a motor shaft of the motor 77 and a pulley that stretches and supports the timing belt together with the pulley 79. One separation member 116 of the separation members 116 has a fixed portion 116d that is fixed to one of the belt faces of the timing belt 80 (the upper belt face of the timing belt 80 in FIG. 15A), and the other of the separation members 116 has a fixed portion 116e that is fixed to the other of the belt faces of the timing belt 80 (the lower belt face of the timing belt 80 in FIG. 15A).

Due to the movement mechanism 76 having the above-described configuration, as the motor shaft of the motor 77 is driven to rotate in the direction indicated by arrow (the clockwise direction) in FIG. 15A, the gear pulley 78 is rotated in the counterclockwise direction, the timing belt 80 is rotated in the counterclockwise direction, and the separation members 116 as a pair of members move from the outward sides toward the center in the width direction of the lamination sheet S (in other words, the separation members 116 as a pair of members move in the direction in which the separation members 116 approach toward each other). In contrast, as the motor shaft of the motor 77 is driven to rotate in the counterclockwise direction that is opposite to the direction indicated by arrow in FIG. 15A, the separation members 116 in pair move from the center toward the outward sides in the width direction of the lamination sheet S (in other words, the separation members 116 as a pair of members move in the direction in which the separation members 116 separate from each other).

Further, as illustrated in FIG. 15B, the movement mechanism 81 includes, for example, a motor 82, racks 83A and 83B, and a gear pinion 84. The gear pinion 84 includes, in steps, a gear that meshes with a motor gear mounted on a motor shaft of the motor 82 and another gear that meshes with each of the pair of rack gears of the racks 83A and 83B in pair. One separation member 116 of the separation members 116 has a fixed portion 116d that is fixed to the rack 83A of the pair of racks, and the other of the separation members 116 has a fixed portion 116e that is fixed to the rack 83B of the pair of racks. Due to the movement mechanism 81 having the above-described configuration, as the motor shaft of the motor 82 is driven to rotate in the direction indicated by arrow (the clockwise direction) in FIG. 15B, the gear pinion 84 is rotated in the counterclockwise direction, and the separation members 116 as a pair of members move from the outward sides toward the center in the width direction of the lamination sheet S (in other words, the separation members 116 as a pair of members move in the direction in which the separation members 116 approach toward each other). In contrast, as the motor shaft of the motor 82 is driven to rotate in the direction opposite to the direction indicated by arrow in FIG. 15B, the separation members 116 in pair move from the center toward the outward sides in the width direction of the lamination sheet S (in other words, the separation members 116 as a pair of members move in the direction in which the separation members 116 separate from each other).

Each of the separation members 116 has the above-mentioned shape illustrated in FIGS. 14A to 14D and is movable in the width direction of the lamination sheet S. Accordingly, the separation members 116 are smoothly inserted into the space C created in the lamination sheet S as illustrated in FIG. 16.

A description of the operation of the sheet processing device 100 is continued below.

Figure 8:
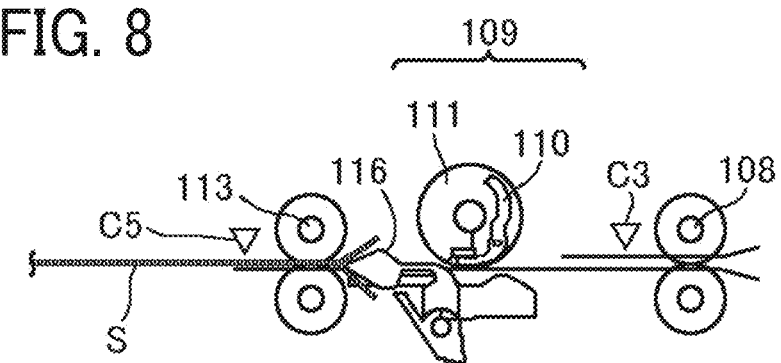
FIG. 8 is a diagram illustrating the main part of the sheet processing device in an operation subsequent to the operation illustrated in FIG. 7.

With the separation members 116 inserted in the space C in the lamination sheet S, the controller 500 in the sheet processing device 100 controls the driver to rotate the winding roller 109 clockwise in the drawings (see FIG. 7). Then, the space C in the lamination sheet S moves to the rear end of the lamination sheet S in the forward conveyance direction (direction A) as illustrated in FIG. 8. After the winding roller 109 is rotated by a predetermined amount, the controller 500 controls the driver to open the sheet gripper 110. As a result, the end portion of the lamination sheet S is separated into the upper and lower sheets.

In this state, the controller 500 in the sheet processing device 100 controls the driver to temporarily stop the conveyance of the lamination sheet S and further move the separation members 116 in the sheet width direction to separate the rear end of the lamination sheet S in the entire range. Note that these operations are performed by conveying the lamination sheet S from the sheet sensor C5 by a specified amount in response to the timing at which the sheet sensor C5 detected the leading end of the lamination sheet S.

Figure 17:
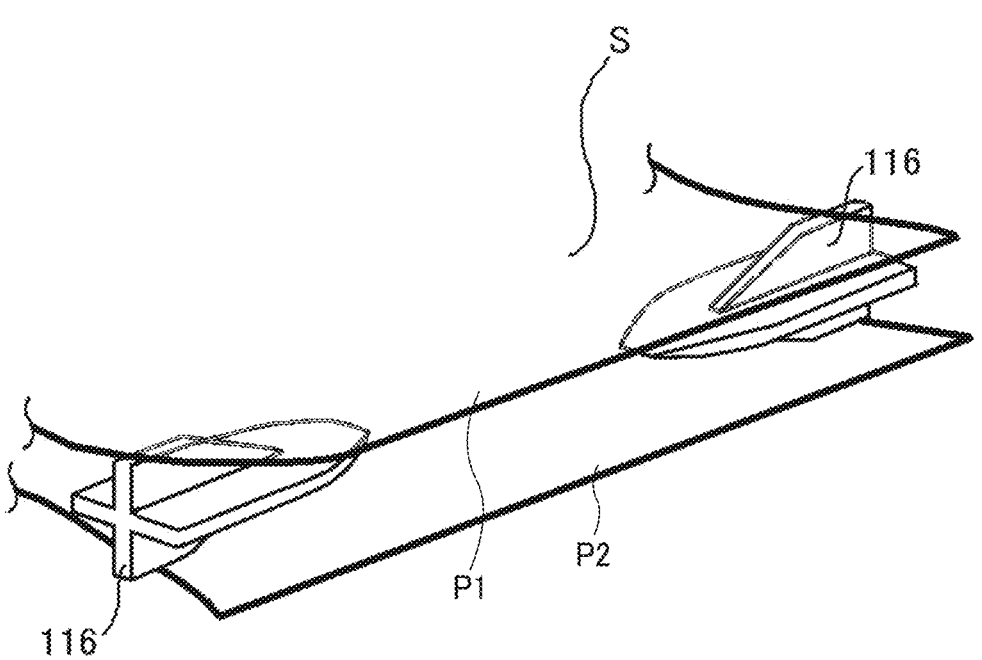
FIG. 17 is a perspective view illustrating the separation members and the sheet S in a state illustrated in FIG. 8.

FIG. 17 is a perspective view illustrating the separation members 116 and the lamination sheet S in the state illustrated in FIG. 8.

Since each separation member 116 further has a branching guide that functions as a guide to guide the two sheets P1 and P2 separated from the lamination sheet S in different directions due to the above-described shape (see FIGS. 14A to 14D), the two sheets separated from the lamination sheet S may be kept in postures to be conveyed to different sheet conveyance passages.

Further, since the separation members 116 are movable in the width direction (see FIGS. 15A and 15B), the separation members 116 are positioned suitably to support the postures of the two sheets of the lamination sheet S as illustrated in FIG. 18. Due to such a configuration, even when the size of the lamination sheet S and the rigidity (or retentivity corresponding to the propensity to retain a particular shape once applied, such as curvature of paper) of the lamination sheet S change, the two sheets separated from the lamination sheet S are guided in desired branching directions. This eliminates the need for a bifurcating member (e.g., a claw-shaped bifurcating plate) over the entire width of the conveyance passage and a driver to drive the bifurcating member, and the cost can be reduced.

Figure 9:
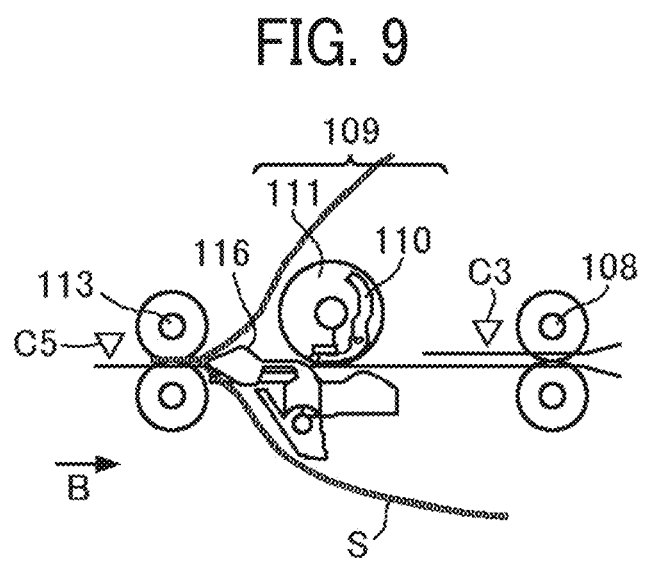

After the separation members 116 separate the rear end of the lamination sheet S in the entire range, as illustrated in FIG. 9, the controller 500 in the sheet processing device 100 controls the driver to rotate the exit roller pair 113 counterclockwise in FIG. 9 and convey the lamination sheet S in the reverse conveyance direction (direction B). Then, the separation members 116 guide the separated two sheets P1 and P2 of the lamination sheet S in the upper and lower directions, respectively, and the two sheets P1 and P2 are fully separated.

Then, the controller 50 in the sheet processing device 100 controls the driver to temporarily stop the conveyance of the lamination sheet S, with the bonded portion of the lamination sheet S held (nipped) in the exit roller pair 113. Accordingly, the lamination sheet S has the bonding side as one end and widely opens the other end.

These operations are performed by conveying the lamination sheet S from the sheet sensor C5 by a specified amount in response to the timing at which the sheet sensor C5 detected the leading end of the lamination sheet S.

Modification

A description is now given of the sheet processing device having another example of a sheet guide passage of the two sheets separated from the lamination sheet S, with reference to FIGS. 10A, 10B, and 10C.

FIGS. 10A, 10B, and 10C are schematic views, each illustrating a sheet guide passage of the two sheets P1 and P2 separated from the lamination sheet S, according to a modification of the present disclosure.

The sheet processing device 100 illustrated in FIG. 10A has the same sheet guide passages as the sheet processing device 100 illustrated in FIG. 9 to guide the two sheets P1 and P2 in the same direction from the bonded portion of the lamination sheet S. Alternatively, the two sheets P1 and P2 may be guided in opposite directions. For example, as illustrated in FIG. 10B, the passages may guide the two sheets P1 and P2 so that the lamination sheet S is conveyed to curve in an inverted S-shape. Alternatively, as illustrated in FIG. 10C, the passages may guide the two sheets P1 and P2 so that the lamination sheet S is conveyed to curve in an S-shape.

Figure 11:
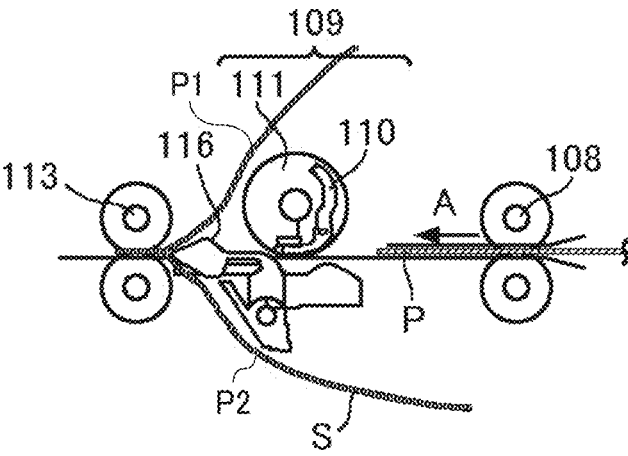
FIG. 11 is a diagram illustrating the main part of the sheet processing device in an operation subsequent to the operation illustrated in FIG. 9.

Then, as illustrated in FIG. 11, the controller 550 of the sheet processing device 100 causes the entrance roller pair 108 to rotate to convey the inner sheet P conveyed from the sheet tray 103 (see FIG. 1) toward the exit roller pair 113 in the forward conveyance direction (i.e., the sheet conveyance direction A).

Figure 12:
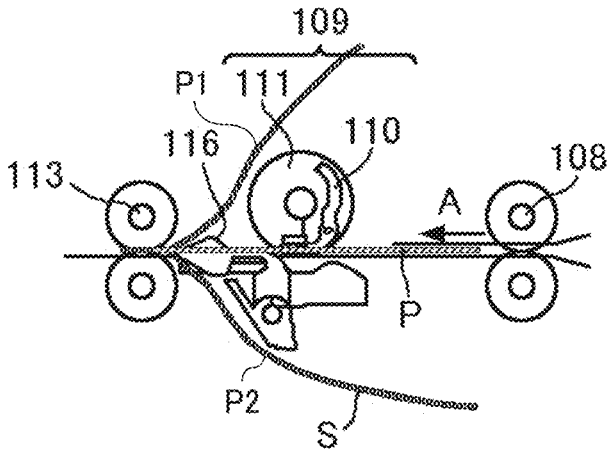
FIG. 12 is a diagram illustrating the main part of the sheet processing device in an operation subsequent to the operation illustrated in FIG. 11.

Subsequently, as illustrated in FIG. 12, the controller 500 in the sheet processing device 100 controls rotations of the exit roller pair 113 so that the lamination sheet S and the insertion sheet P converge to insert the insertion sheet P into the opened lamination sheet S.

Figures 13A, 13B:
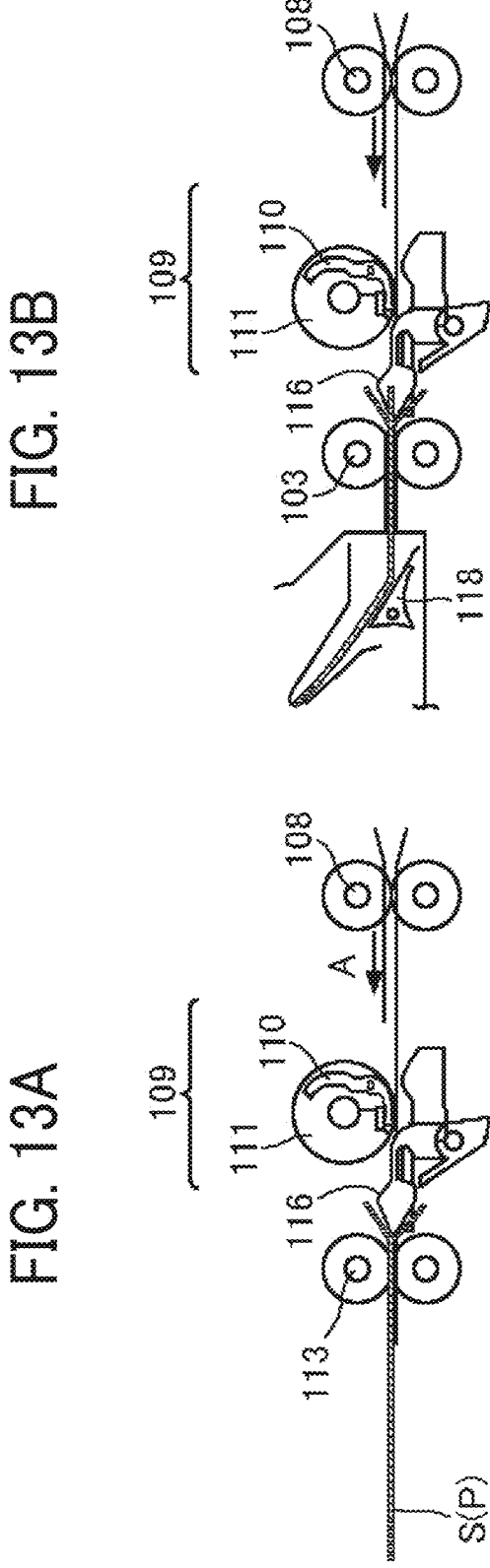
FIGS. 13A and 13B are diagrams each illustrating the main part of the sheet processing device in an operation subsequent to the operation illustrated in FIG. 11.

As illustrated in FIG. 13A, the exit roller pair 113 of the sheet processing device 100 conveys the two-ply sheet S in which the inner sheet P is inserted, in the forward conveyance direction (i.e., the sheet conveyance direction A). Thus, the two sheets P1 and P2 of the two-ply sheet S are overlapped one on another again so as to close the open portion of the two-ply sheet S. Then, a roller disposed downstream from the exit roller pair 113 ejects and stacks the two-ply sheet S with the inner sheet PM inserted (nipped), on the sheet ejection tray 104 (see FIG. 1).

As an alternative example, in a case in which a sheet processing device includes a heat-pressure device that can heat and press the two-ply sheet S, as illustrated in FIG. 13B, a branching member 118 may change (switch) the sheet conveyance passage of the two-ply sheet S to convey the two-ply sheet S to the heat-pressure device.

As described above, the sheet processing device 100 causes the driver to largely open the two sheets P1 and P2 of the two-ply sheet S so as to insert and nip the inner sheet Pinto the two-ply sheet S between the two sheets P1 and P2.

A description is given of a laminator, an image forming apparatus, and an image forming system, each including the sheet processing device according to an embodiment of the present disclosure.

Figure 19:
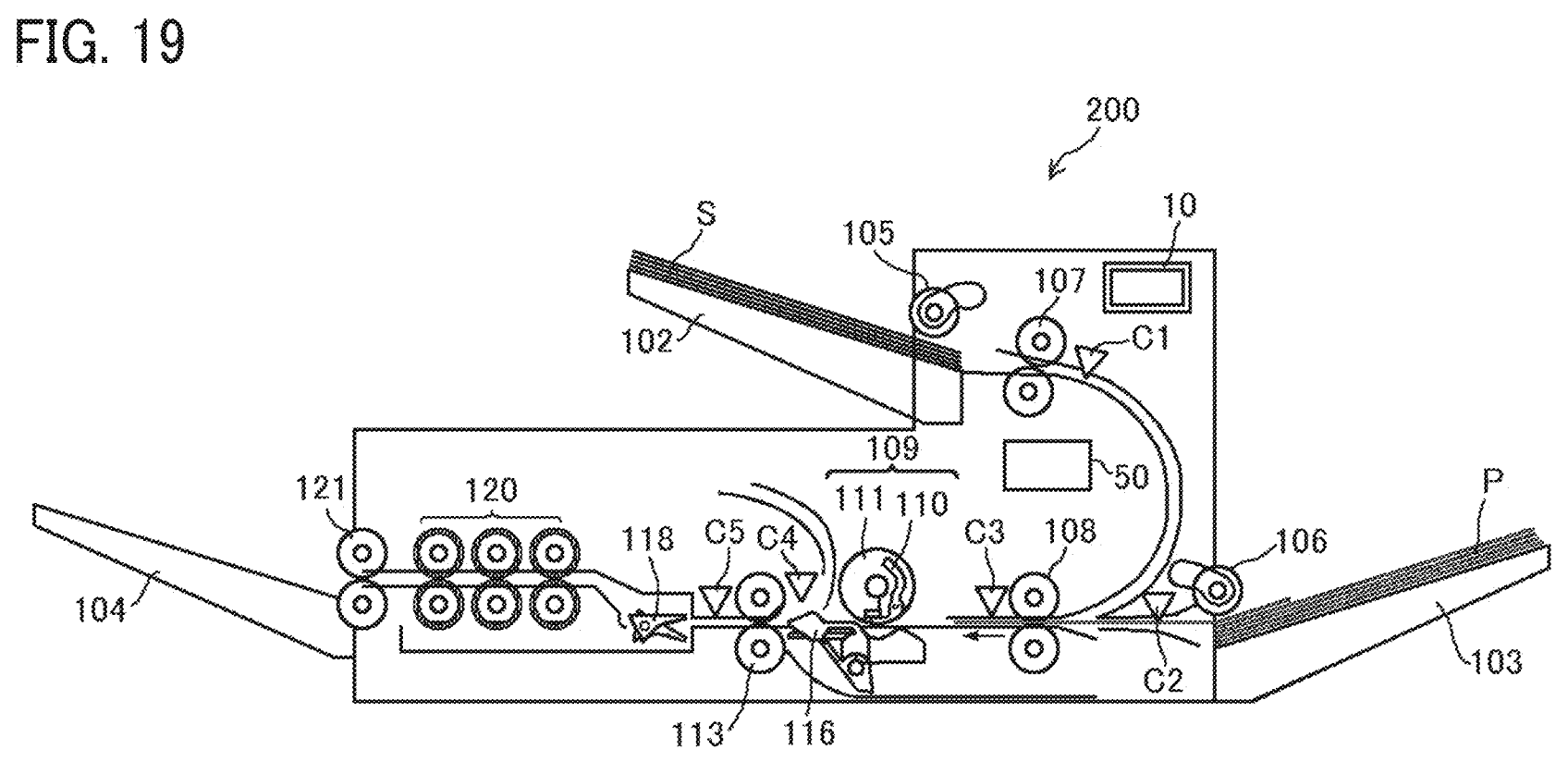

FIG. 19 is a schematic diagram illustrating an overall configuration of a sheet laminator according to an embodiment of the present disclosure, including the sheet processing device illustrated in FIG. 1.

A sheet laminator 200 includes the sheet processing device 100 described above, the branching member 118 for switching the conveyance passage of the sheet S, a thermal pressure roller pair 120 as a heat and pressure member capable of heating and pressing the sheet S, and the sheet ejection roller pair 121 provided downstream of the thermal pressure roller pair 120.

The sheet laminator 200 performs a series of operations, in this order, of feeding the lamination sheet S, separating the lamination sheet S, inserting the inner sheet P into the lamination sheet S, and laminating the lamination sheet S with the inner sheet P being inserted, by application of heat and pressure, on a stand-alone basis. This series of operations is carried out automatically without any aid of a user. For this reason, the sheet laminator 200 can enhance and provide the convenience better than a known sheet laminator employing a known technique.

Figure 20:
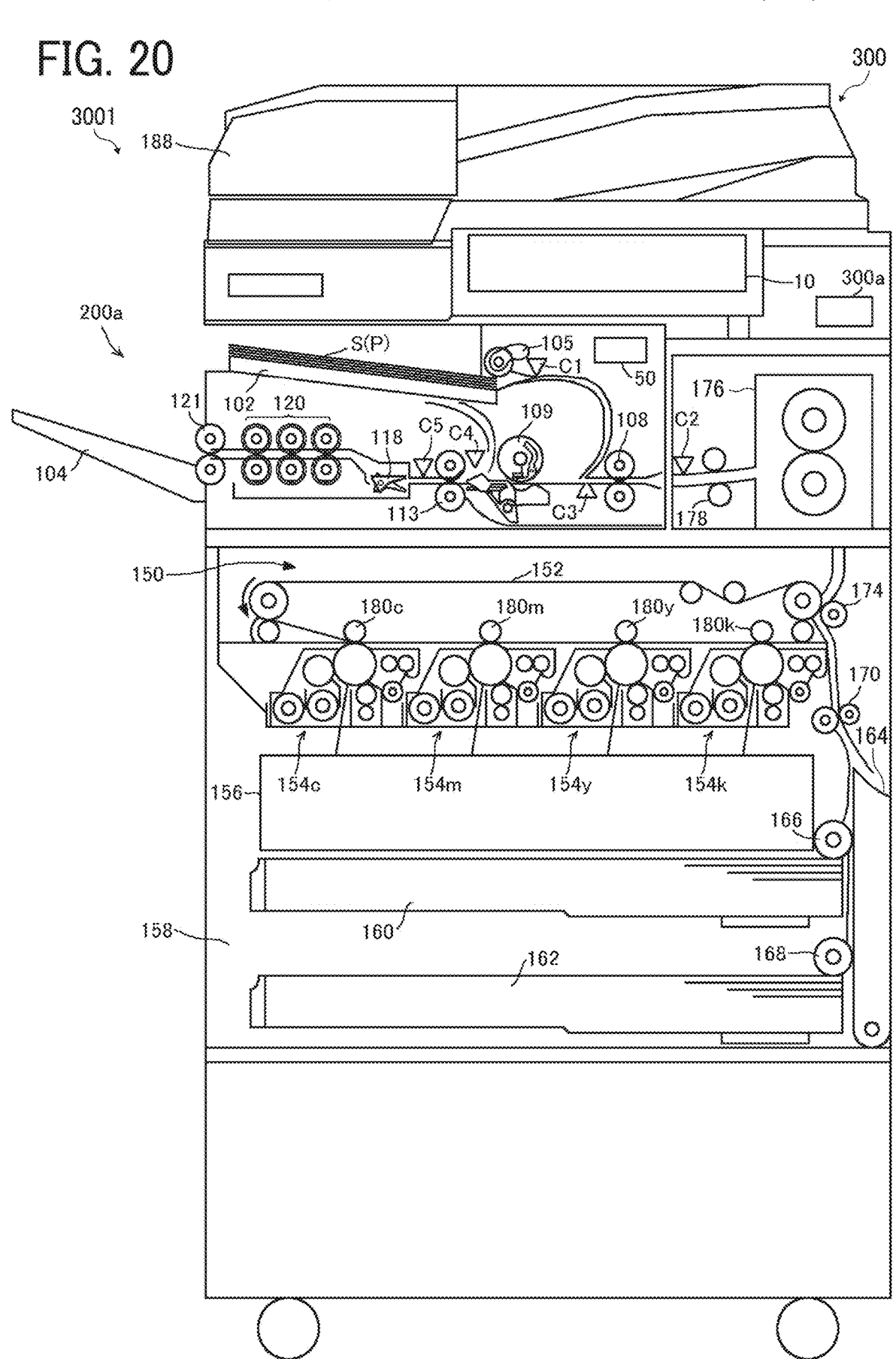
FIG. 20 is a diagram illustrating an overall configuration of an image forming apparatus according to an embodiment of the present disclosure, including the sheet laminator illustrated in FIG. 19.

FIG. 20 is a schematic diagram illustrating the overall configuration of an example of an image forming system according to an embodiment of the present disclosure, including the sheet laminator illustrated in FIG. 19.

An image forming system 3001 includes a sheet laminator 200a in an in-body sheet discharging section of an image forming apparatus 300. The sheet laminator 200a is detachably attached to the in-boy sheet discharging section of the image forming apparatus 300. A control panel 10 is provided on the exterior of the image forming apparatus 300. The control panel 10 functions as a display-operation device that displays information in the image forming apparatus 300 and receives input of the operation of the image forming apparatus 300. The control panel 10 also functions as a notification device that issues a perceptual signal to the user.

The sheet laminator 200a includes the sheet tray 102 on which the lamination sheets S or the inner sheets P are stacked. The sheet laminator 200a can receive the lamination sheets S, the inner sheets P, or both from the image forming apparatus 300. Accordingly, the image forming apparatus 300 (e.g., a printer and a copier) can add (form) an image on the two-ply sheet S or the inner sheet P by the in-line connection.

A detailed description is given of the configuration of the image forming apparatus 300, with reference to FIG. 20.

As illustrated in FIG. 20, the image forming apparatus 300 includes an intermediate transfer device 150. The intermediate transfer device 150 includes an intermediate transfer belt 152 having an endless loop and being entrained around a plurality of rollers and stretched substantially horizontally. The intermediate transfer belt 152 rotates in the counterclockwise direction in FIG. 20.

The image forming apparatus 300 further includes image forming units 154c, 154m, 154y, and 154k for cyan (C), magenta (M), yellow (Y), and black (K), respectively. The image forming units 154c, 154m, 154y, and 154k are disposed below the intermediate transfer device 150 in the housing of the image forming apparatus 300. The image forming units 154c, 154m, 154y, and 154k are aligned in a quadruple tandem manner along an extended direction of the intermediate transfer belt 152. Each of the image forming units 154c, 154m, 154y, and 154k includes a drum-shaped image bearer that rotates in the clockwise direction in FIG. 25. Various image forming components, for example, a charging unit, a developing unit, a transfer unit, and a cleaning unit, are disposed around each of the image forming units 154c, 154m, 154y, and 154k. An exposure device 156 is disposed below the image forming units 154c, 154m, 154y, and 154k included in the image forming apparatus 300.

A sheet feeder 158 is disposed below the exposure device 156 in the image forming apparatus 300. The sheet feeder 158 includes a first sheet tray 160 that stores lamination sheets S and a second sheet tray 162 that stores inner sheets P. The first sheet tray 160 functions as a third sheet stacker on which a two-ply sheet such as the lamination sheet S is stacked. Similarly, the second sheet tray 162 functions as a fourth sheet stacker on which a sheet medium (e.g., the inner sheet P) is stacked.

A first feed roller 166 is disposed at a position upper right of the first sheet tray 160. The first feed roller 166 feeds out the lamination sheet S one by one from the first sheet tray 160 to a sheet conveyance passage 164. A second feed roller 168 is disposed at the upper right of the second sheet tray 162 and feeds the inner sheet P from the second sheet tray 162 one by one to the sheet conveyance passage 164.

The sheet conveyance passage 164 extends upwardly from the lower side to the upper side on the right side in the image forming apparatus 300 and communicates with the sheet laminator 200a in the image forming apparatus 300. The sheet conveyance passage 164 is provided with, e.g., a conveyance roller pair 170, a secondary transfer device 174 disposed facing the intermediate transfer belt 152, a fixing device 176, and a sheet ejection device 178 including an ejection roller pair, serially.

Each of the first feed roller 166, the conveyance roller pair 170, and the sheet conveyance passage 164 serves as a third sheet feeder to feed the two-ply sheet from the first sheet tray 160 (third sheet stacker).

Each of the second feed roller 168, the conveyance roller pair 170, and the sheet conveyance passage 164 serves as a fourth sheet feeder to feed a sheet medium from the second sheet tray 162 (fourth sheet stacker). Further, the intermediate transfer device 150 and the fixing device 176 serve as a part of the image forming device 140 that forms an image on a two-ply sheet or a sheet medium.

A description is given of operations of the image forming apparatus 300 according to the present embodiment, to form an image on the two-ply sheet S and then perform a sheet laminating operation on the two-ply sheet S.

To perform an image on the two-ply sheet S, first, an image reading device 188 reads the image on an original document, and the exposure device 156 then performs writing of the image on the original document. The image forming units 154c, 154m, 154y, and 154k form respective toner images of cyan (C), magenta (M), yellow (Y), and black (K), respectively, on the respective image bearers. Then, primary transfer devices 180c, 180m, 180y, and 180k sequentially transfer the respective toner images onto the intermediate transfer belt 152, thereby forming a color image on the intermediate transfer belt 152.

By contrast, the image forming apparatus 300 rotates the first feed roller 166 to feed and convey the two-ply sheet S to the sheet conveyance passage 164. The two-ply sheet S is conveyed by the conveyance roller pair 170 through the sheet conveyance passage 164 and is sent to a secondary transfer position in synchrony with movement of the color image on the intermediate transfer belt 152. Then, the secondary transfer device 174 transfers the color image formed on the intermediate transfer belt 152 as described above, onto the two-ply sheet S.

After the color image has been transferred onto the two-ply sheet S, the fixing device 176 fixes the color image to the two-ply sheet S, and the sheet ejection device 178 ejects to convey the two-ply sheet S to the sheet laminator 200a.

Further, the image forming apparatus 300 rotates the second feed roller 168 to feed the inner sheet P to the sheet conveyance passage 164, and the sheet ejection device 178 ejects to convey the inner sheet P to the sheet laminator 200a.

As described above, the two-ply sheet S on which the image has been formed and the inner sheet P are conveyed to the sheet laminator 200a, so that the sheet laminating operation is performed by the sheet laminator 200a. The details of the sheet laminating operation have been described above and the redundant descriptions are omitted.

According to the above-described configuration of the image forming apparatus 300 according to the present embodiment, the sheet laminator 200a can also perform the sheet laminating operation after an image is formed on the inner sheet P. The sheet laminator 200a may also perform the sheet laminating operation after images are formed on the inner sheet P and the two-ply sheet S.

Figure 21:
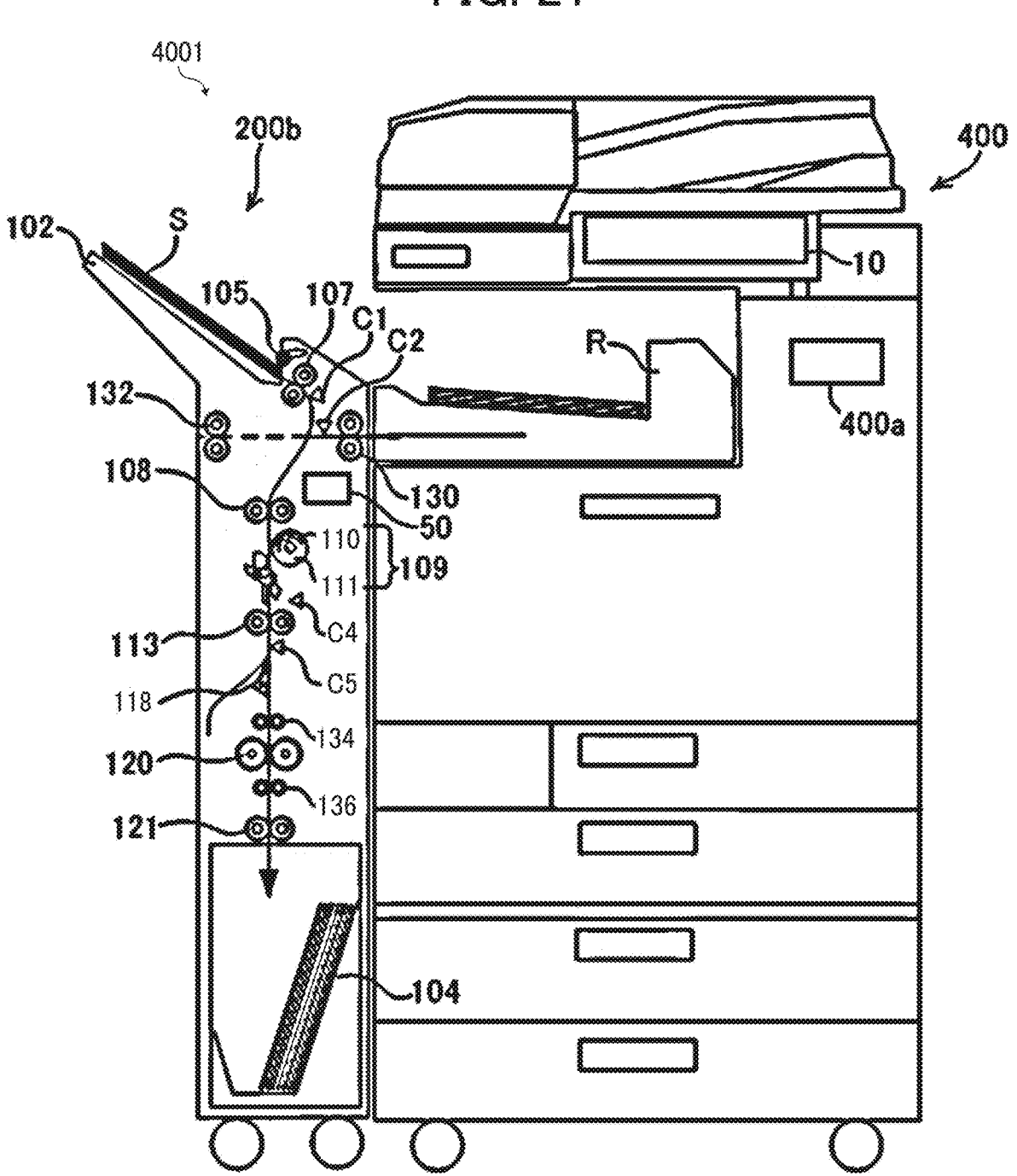
FIG. 21 is a diagram illustrating an overall configuration of an image forming apparatus provided with a sheet laminator on the outside.

FIG. 21 is a diagram illustrating an overall configuration of an image forming system provided with a sheet laminator on the outside.

In FIG. 21, elements identical to those illustrated in FIG. 19 or 20 are given identical reference numerals, and the descriptions thereof are omitted.

In an image forming system 4001 illustrated in FIG. 21, an image forming apparatus 400 is basically same as the image forming apparatus 300 illustrated in FIG. 20. However, different from the image forming system 3001 illustrated in FIG. 20, the image forming system 4001 illustrated in FIG. 21 includes a sheet laminator 200b on the outside of the housing of the image forming apparatus 400.

The sheet laminator 200b conveys the two-ply sheet (two-ply sheet S) in the vertical direction and perform the sheet laminating operation. The sheet laminator 200b includes the sheet tray 102 on which the two-ply sheets S are stacked. The sheet laminator 200b can receive the two-ply sheets S, and the inner sheets P form the image forming apparatus 400 via a relay device R. Accordingly, a printer or a copier (e.g., the image forming apparatus 400) can add (form) an image on the inner sheet P by the in-line connection.

A lamination sheet S into which an inner sheet has been inserted is ejected and stacked on the sheet ejection tray 104 by an exit roller pair 113 or a roller pair disposed downstream from the exit roller pair 113. The sheet ejection tray 104 is disposed inside a housing of the sheet laminator 200b. Such a configuration facilitates a vertical conveyance of the lamination sheet S toward the sheet ejection tray 104.

Specifically, the two-ply sheet S in which the inner sheet P has been sandwiched between the two sheets P1 and P2 of the two-ply sheet S is conveyed to a fixing device having thermal pressure roller pairs 120 by the exit roller pair 113 or the roller pairs (e.g., the conveyance roller pairs 130, 132, 134, and 136) disposed downstream from the exit roller pair 113 in the conveyance direction of the two-ply sheet S.

When passing through the thermal pressure roller pairs 120, the two-ply sheet S is thermally pressed and fixed. After passing through the thermal pressure roller pairs 120, the two-ply sheet S continues to be conveyed vertically downward toward the sheet ejection tray 104 and is stacked on the sheet ejection tray 104.

Since the two-ply sheet S pressed after passing through the thermal pressure roller pairs 120 is ejected vertically downward in this manner, the two-ply sheet S can be stacked on the sheet ejection tray 104 while preventing the heated two-ply sheet S from being bent by an external force.

Further, an image forming system according to an embodiment of the present disclosure may include an image forming apparatus and a sheet laminator 200b detachably attached to the image forming apparatus.

A description is now given of a sheet laminator according to a first embodiment of the present disclosure.

First Embodiment

Figure 22:
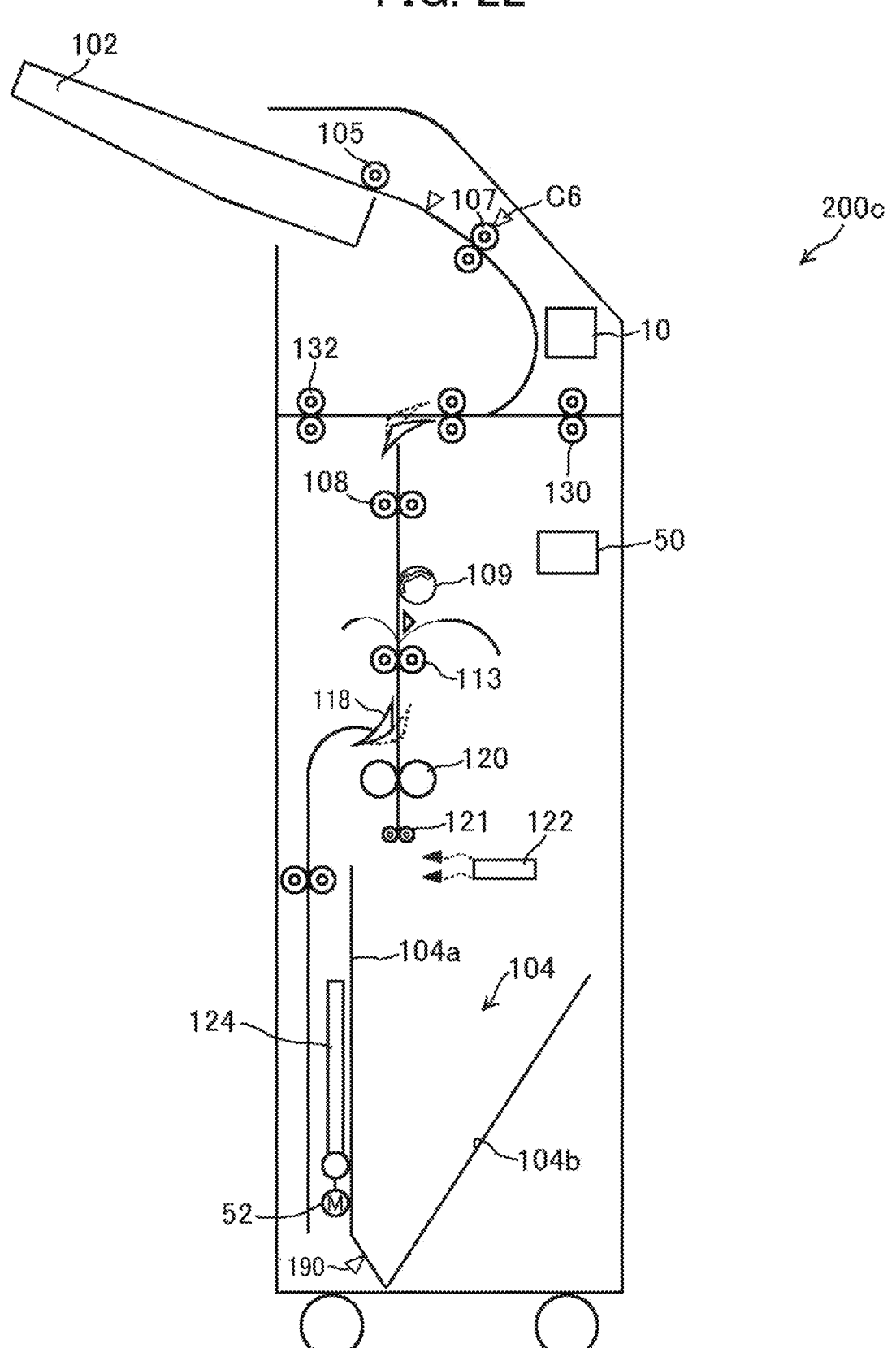
FIG. 22 is a diagram illustrating an overall configuration of a sheet laminator according to a first embodiment of the present disclosure.

A description is given of a sheet laminator according to a first embodiment of the present disclosure, with reference to FIG. 22.

FIG. 22 is a schematic diagram illustrating an overall configuration of a sheet laminator according to first embodiment of the present disclosure.

In FIG. 22, the same components as the components in FIGS. 1 to 21 are denoted by the same reference numerals, and the detailed description of the configuration will be omitted.

The sheet laminator 200c includes a sheet processing portion to separate the two-ply sheet S to insert the inner sheet P in the two-ply sheet S. The sheet processing portion includes, for example, an entrance roller pair 108, a winding roller 109, and an exit roller pair 113. The sheet laminator 200c further includes the thermal pressure roller pairs 120, a sheet ejection roller pair 121, an air blower 122, and a sheet ejection tray 104, disposed downstream from the sheet processing portion in the conveyance direction of the lamination sheet S.

The sheet ejection roller pair 121 ejects the lamination sheet S, which has passed the thermal pressure roller pairs 120, downward in the vertical direction. The sheet ejection tray 104 is disposed downstream from the sheet ejection roller pair 121 in the vertical direction, and includes a receiving face 104a to receive the lamination sheet S ejected from the sheet ejection roller pair 121 and standing in sheet ejection tray, and a stacking face 104b facing the receiving face 104a and inclined with respect to the vertical direction.

Figure 23:
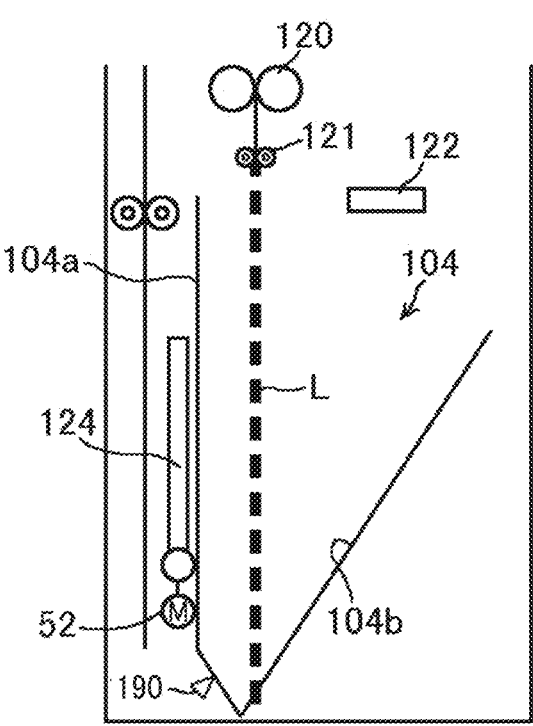
FIG. 23 is a diagram illustrating relative positions of a sheet ejection roller pair and a stacking face of a sheet ejection tray.

FIG. 23 is a diagram illustrating relative positions of the sheet ejection roller pair 121 and the stacking face 104b of the sheet ejection tray 104.

As illustrated in FIG. 23, an extension line L of the nip region of the sheet ejection roller pair 121 is located at a position intersecting with the stacking face 104b facing the sheet ejection tray 104 and inclined with respect to the vertical direction.

The sheet ejection tray 104 includes a pressing member 124 that is driven by a driving motor 52 serving as a drive unit. The pressing member 124 moves the lamination sheet S on the receiving face 104a and presses against the stacking face 104b.

The configurations and functions of the sheet processing portion (such as the entrance roller pair 108, the winding roller 109, and the exit roller pair 113) and the fixing device (such as the thermal pressure roller pairs 120) have already been described in the descriptions of the sheet processing device 100 and the sheet laminator 200, the redundant descriptions are summarized or omitted accordingly.

Figures 24A, 24B, 24C:
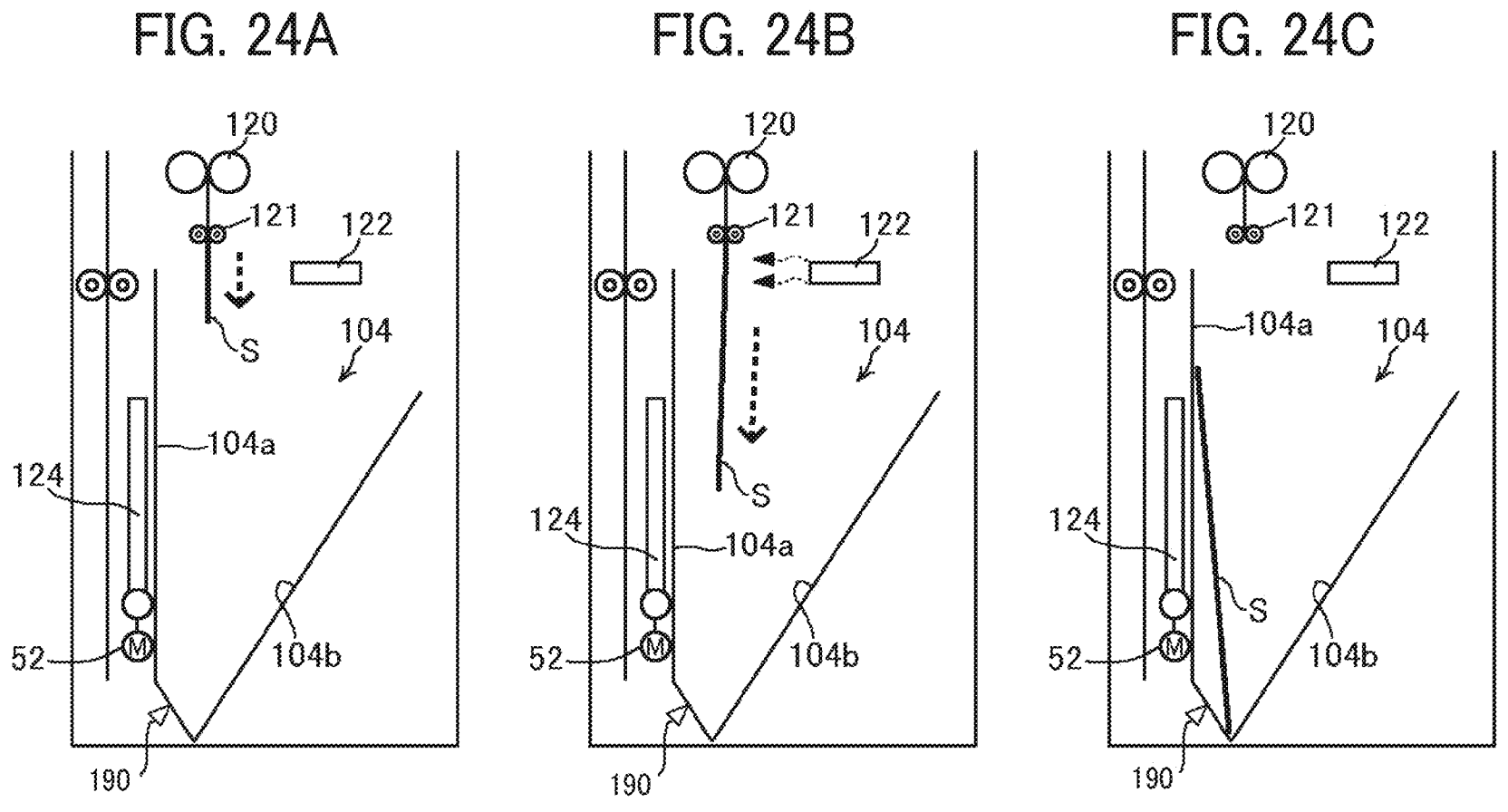

FIGS. 24A, 24B and 23C are schematic diagrams illustrating a sheet ejecting operation of a sheet subjected to a sheet laminating operation to a receiving face of the sheet ejection tray.

Specifically, FIG. 24A is a schematic diagram illustrating the state at the start of the sheet ejecting operation of the lamination sheet S by the sheet ejection roller pair 121.

FIG. 24B is a schematic diagram illustrating the state during the sheet ejecting operation of the lamination sheet S by the sheet ejection roller pair 121.

FIG. 24C is a schematic diagram illustrating the state of completion of the sheet ejecting operation of the lamination sheet S by the sheet ejection roller pair 121.

As illustrated in FIG. 24A, the lamination sheet S that has passed the thermal pressure roller pairs 120 is ejected vertically downward by the sheet ejection roller pair 121. At this time, the temperature of the lamination sheet S is relatively high, and the glue between the two sheets P1 and P2 of the lamination sheet S is not yet cured.

Then, as illustrated in FIG. 24B, while the lamination sheet S is ejected by the sheet ejection roller pair 121, the air blower 122 blows air to the lamination sheet S to cool the lamination sheet S. As a result, the glue between the two sheets of the lamination sheet S is promoted to cure and the lamination sheet S is biased by air pressure toward the receiving face 104a of the sheet ejection tray 104.

Then, as illustrated in FIG. 24C, the lamination sheet S falls onto the sheet ejection tray 104 when the trailing end of the lamination sheet S has completely passed through the sheet ejection roller pair 121, to be received in the standing state by the receiving face 104a. Accordingly, the leading end of the lamination sheet S, with the glue applied between the two sheets P1 and P2 that has not yet completely cured, is prevented from contacting another lamination sheet S stacked on the stacking face 104*b* of the sheet ejection tray 104.

A detailed description is now given of problems that might occur to a sheet laminator according to the present disclosure.

FIG. 25A is a schematic diagram illustrating the state of the lamination sheet S in the sheet ejection tray 104 when the lamination sheet is curled.

FIG. 25B is a schematic diagram illustrating the state of the lamination sheet S in the sheet ejection tray 104 when the lamination sheet has a pressing mark.

If the lamination sheet S ejected by the sheet ejection roller pair 121 is leaned against the receiving face 104*a*, the curl may be worsened due to the weight of the lamination sheet S (see FIG. 25A).

Since the glue applied between the two sheets P1 and P2 of the lamination sheet S is not completely cured to fix the two sheets of the lamination sheet S, when the lamination sheet S is pressed against the stacking face 104*b* of the sheet ejection tray 104 by the pressing member 124, the pressing mark (recessed mark) is likely to be left on the surface of the lamination sheet S (see FIG. 25B).

In a typical sheet laminator, a lamination sheet S is pressed against the stacking face 104*b* immediately after the lamination sheet S is ejected by the sheet ejection roller pair 121 or after the lamination sheet S has waited for a given time. For this reason, a curl or a pressing mark may occur on the lamination sheet S.

A description is given below of a sheet laminator that prevents a lamination sheet from worsening the curl when the lamination sheet is ejected in the standing state and from having a pressing mark (recessed mark) on the surface of the lamination sheet.

Figures 26A, 26B, 26C:
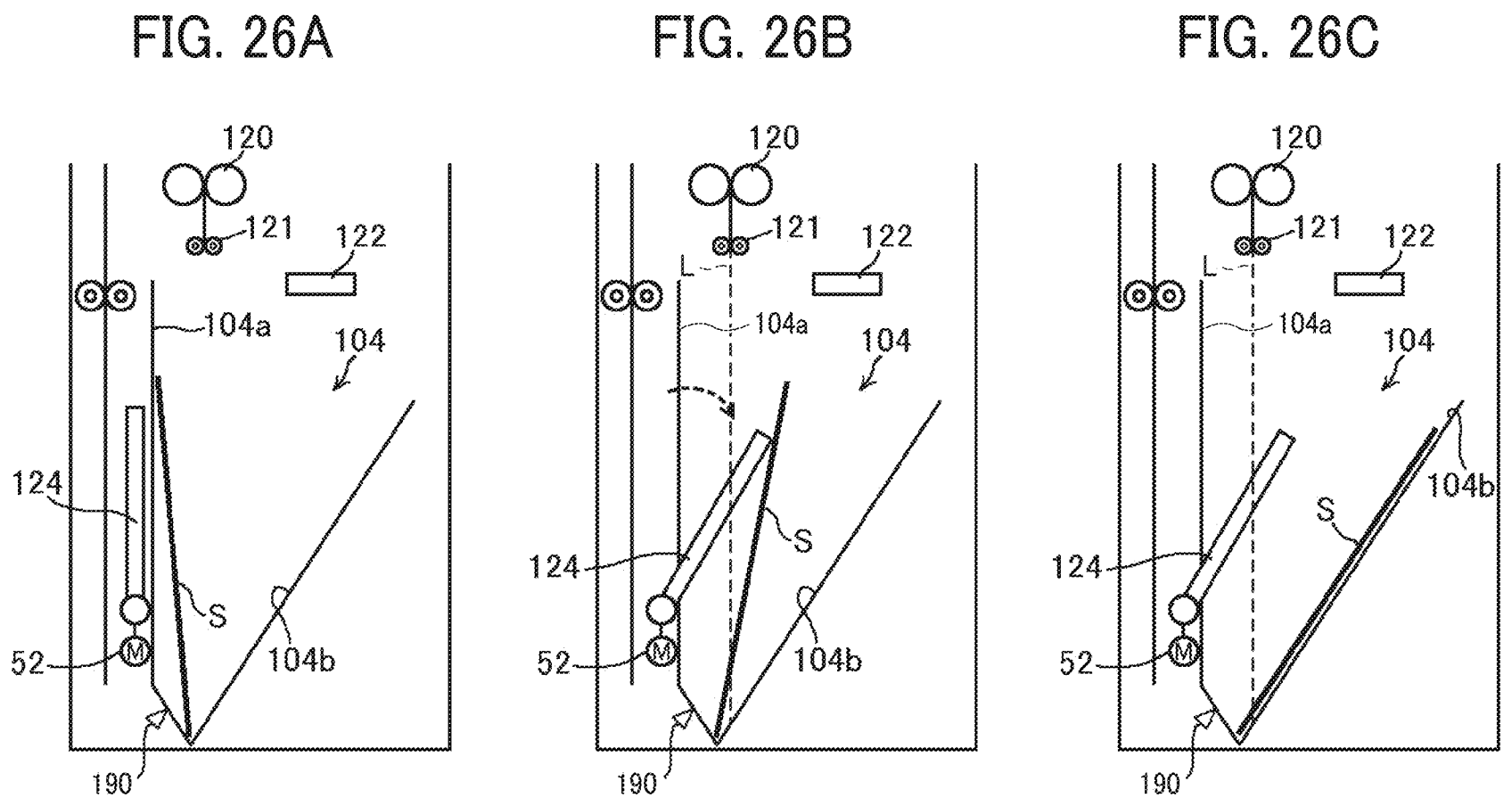

FIGS. 26A, 26B and 26C are schematic diagrams each illustrating a first operation of a pressing member that moves the sheet on the receiving face 104*a* of the sheet ejection tray 104 to the stacking face 104*b* of the sheet ejection tray 104. First, as illustrated in FIG. 26A, the lamination sheet S is in a state of leaning against the receiving face 104*a* of the sheet ejection tray 104.

Then, as illustrated in FIG. 26B, the pressing member 124 moves the leading end of the pressing member 124 from the receiving face 104*a* toward the stacking face 104*b* to the first position beyond the extension line L (see FIG. 23). Then, as illustrated in FIG. 26C, the pressing member 124 stacks the lamination sheet S on the stacking face 104*b* in the first operation, and temporarily stops at the position (i.e., the first position).

As the lamination sheet S is moved by the pressing member 124 toward the stacking face 104*b* beyond the extension line L, the force (torque) that the lamination sheet S inclines toward the stacking face 104*b* in response to the movement of the center of gravity of the lamination sheet S. As a result, the lamination sheet S leans to the stacking face 104*b* to be stacked on the stacking face 104*b*.

At the time that the first operation is completed (see FIG. 26C), the lamination sheet S still has a relatively high temperature and the glue applied between the two sheets P1 and P2 of the lamination sheet S is not (or highly unlikely to be) completely cured.

Figures 27A, 27B:
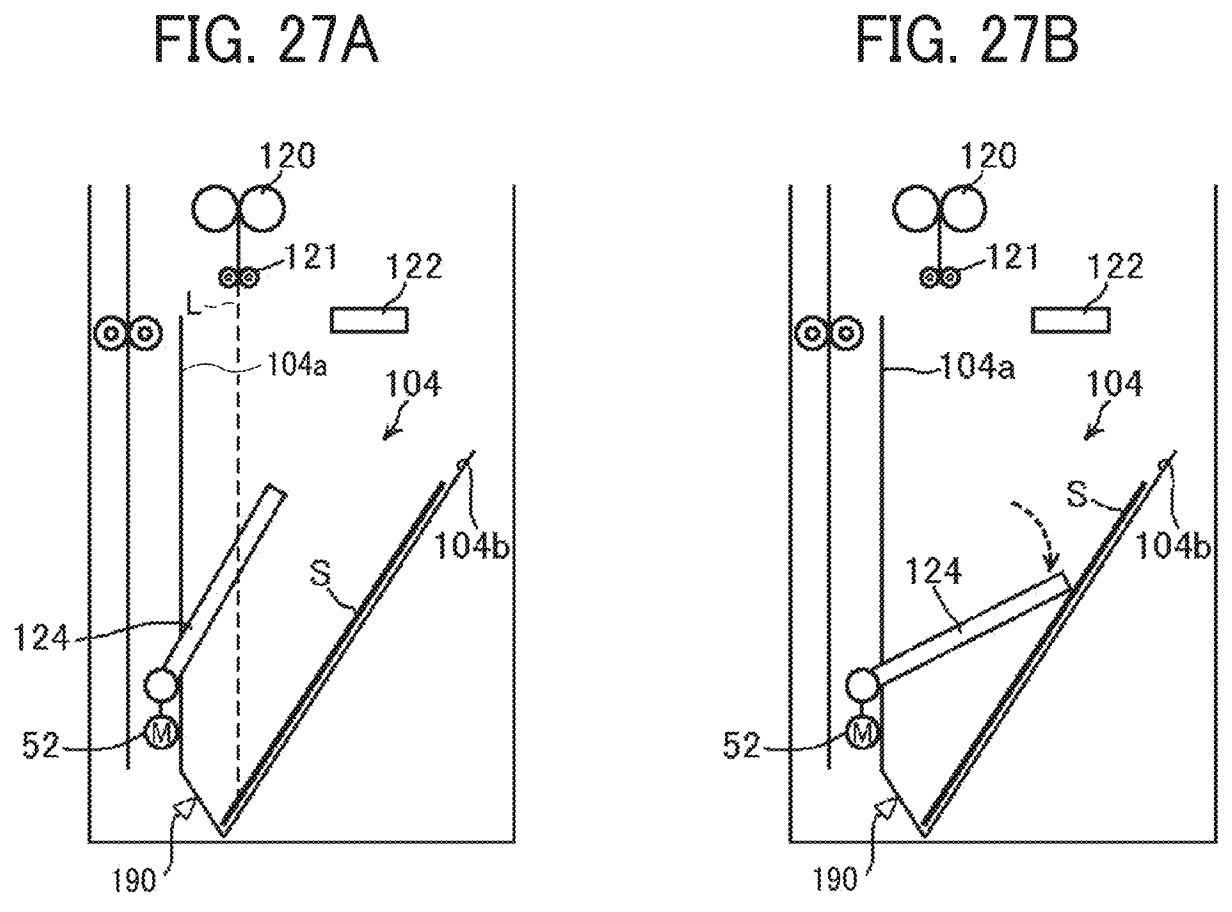

FIGS. 27A and 27B are schematic diagrams each illustrating a second operation of the pressing member that presses the lamination sheet S to the stacking face 104*b* of the sheet ejection tray 104.

First, as illustrated in FIG. 27A, the pressing member 124 is temporarily stopped at the first position. Due to this temporary stop, the glue applied between the two sheets P1 and P2 of the lamination sheet S stacked on the stacking face 104*b* can be further cured. In other words, the pressing member 124 maintains the state in which the pressing member 124 stops at the first position for at least the given time that the glue applied on the lamination sheet(s) S stacked on the stacking face 104*b* is cured.

Then, as illustrated in FIG. 27B, the leading end of the pressing member 124 is moved from the first position after the given time has elapsed, to press the lamination sheet S against the stacking face 104*b* in the second operation.

The operation of pressing the lamination sheet S against the stacking face 104*b* by the pressing member 124, in other words, the second operation, provides merits (effects) of (1) reducing the curl generated in the lamination sheet S stacked on the stacking face 104*b*, (2) being capable of preventing the lamination sheet S, with the glue applied between the two sheets P1 and P2 not having completely cured, in the middle of or immediately after ejection from the sheet ejection roller pair 121 from contacting another lamination sheet S stacked on the stacking face 104*b*, and (3) obtaining the stacking space on the stacking face 104*b*.

Second Embodiment

FIGS. 28A, 28B, 28C and 28D are schematic diagrams each illustrating the sheet processing device according to a second embodiment of the present disclosure, having the processing member in which the operation speed of the second operation is slower than the operation speed of the first operation.

In the first embodiment, the pressing member 124 is temporarily stopped between the first operation and the second operation for the given time. In the second embodiment, however, the operation speeds of the first operation and the second operation are changed (decelerated) to obtain the time in which the glue applied between the two sheets P1 and P2 of the lamination sheet S is cured.

A detailed description is now given of the operation of a sheet laminator according to the second embodiment.

Figures 28A, 28B:
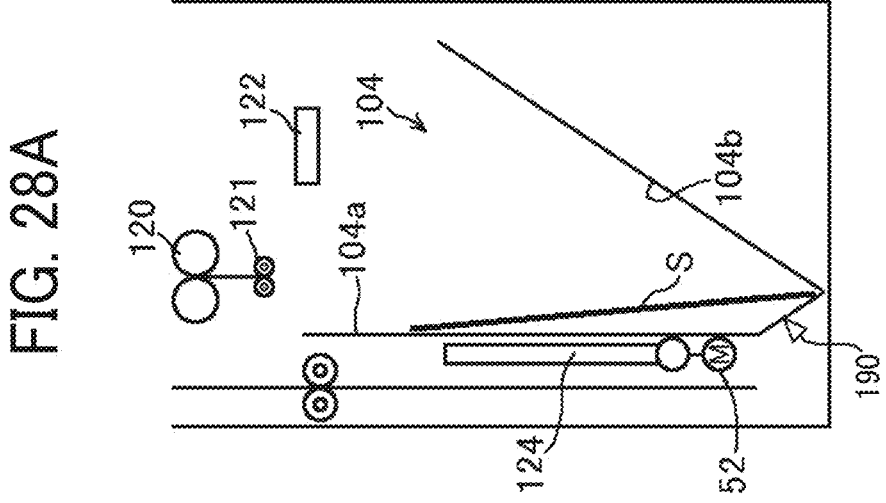
FIGS. 28A, 28B, 28C and 28D are schematic diagrams each illustrating the sheet processing device according to a second embodiment of the present disclosure, having the processing member in which the operation speed of the second operation is slower than the operation speed of the first operation.

As illustrated in FIG. 28A, the lamination sheet S that is ejected by the sheet ejection roller pair 121 is leaned against the receiving face 104*a*. Then, as illustrated in FIG. 28B, the pressing member 124 moves the leading end from the receiving face 104*a* toward the stacking face 104*b* to the first position beyond the extension line L (see FIG. 23) at a speed Va in the first operation.

Figures 28C, 28D:
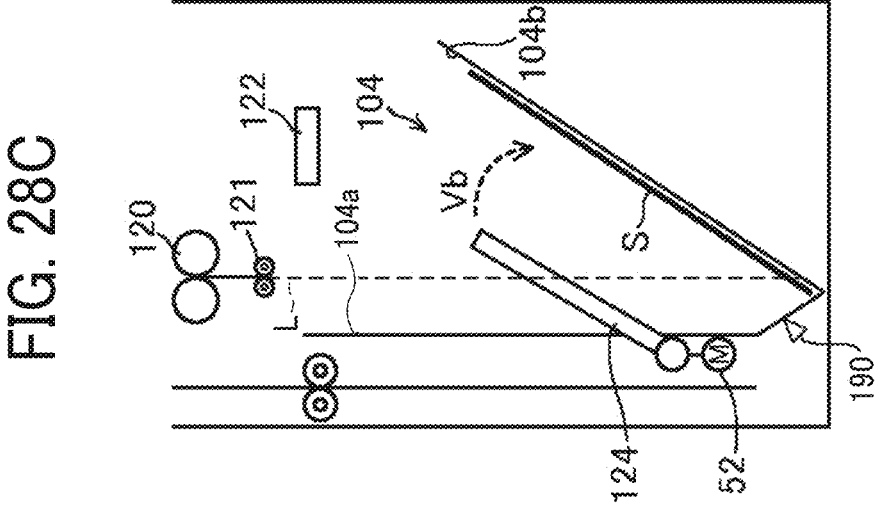

Then, as illustrated in FIG. 28C, the speed of the leading end of the pressing member 124 is decelerated to a speed Vb. The relation of the speed Va and the speed Vb is expressed as Va>Vb. Then, as illustrated in FIG. 28D, the leading end of the pressing member 124 is pressed against the lamination sheet S in the second operation.

At the time that the speed of the leading end of the pressing member 124 is decelerated to the speed Vb (see FIG. 28C), the lamination sheet S still has a relatively high temperature and the glue applied between the two sheets P1 and P2 of the lamination sheet S is not (or highly unlikely to be) completely cured. However, since a sufficient time can be obtained before the leading end of the pressing member 124 presses the lamination sheet S (see FIG. 28D), the lamination sheet S can be prevented from having a pressing mark (recessed mark).

As described above, the configuration of the sheet laminator according to the second embodiment can prevent the lamination sheet S from having the pressing mark (recessed mark) on the lamination sheet S and worsening the curl of the lamination sheet S when the lamination sheet S is ejected in the standing state.

A description is given below of the detailed configuration of the sheet laminator.

(1) Tray-Full Detection

Figures 29A, 29B, 30:
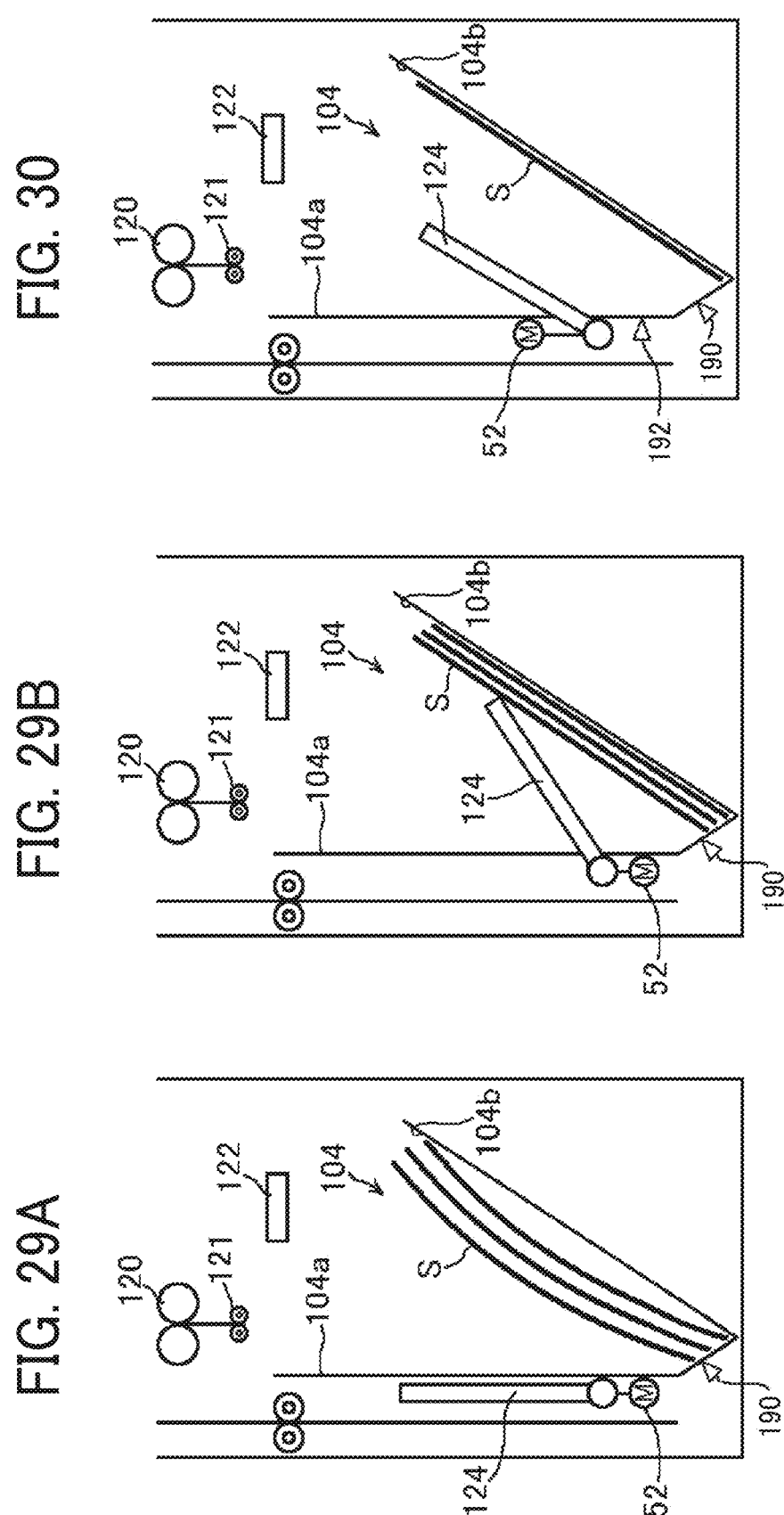
FIGS. 29A and 29B are schematic diagrams each illustrating a sheet ejection tray including a tray-full detection sensor.
FIG. 30 is a schematic diagram illustrating the sheet ejection tray including a temperature detection sensor.

FIGS. 29A and 29B are schematic diagrams each illustrating the sheet ejection tray 104 including a tray-full detection sensor.

The sheet ejection tray 104 includes a tray-full detection sensor 190 that detects whether the stack amount of lamination sheets S stacked on the stacking face 104b is reached to the upper limit of the sheet ejection tray 104, in other words, the stacking face 104b of the sheet ejection tray 104 is full of lamination sheets S (a sheet-full detection or a tray-full detection).

When the lamination sheet S on the stacking face 104b has a curl, the tray-full detection sensor 190 is likely to cause false detection (see FIG. 29A). In contrast, when the tray-full detection sensor 190 detects the state that the sheet ejection tray 104 is full of lamination sheets S while the pressing member 124 presses the lamination sheet S against the stacking face 104b, such a false detection can be prevented (see FIG. 29B).

The tray-full detection sensor 190 is an example of a tray-full detector. The tray-full detector may be, for example, a laser displacement sensor.

(2) Temperature Detection

FIG. 30 is a schematic diagram illustrating the sheet ejection tray 104 including a temperature detection sensor.

The sheet ejection tray 104 includes a temperature detection sensor 192 that detects the surface temperature of the lamination sheet S stacked on the stacking face 104b.

Figure 31:
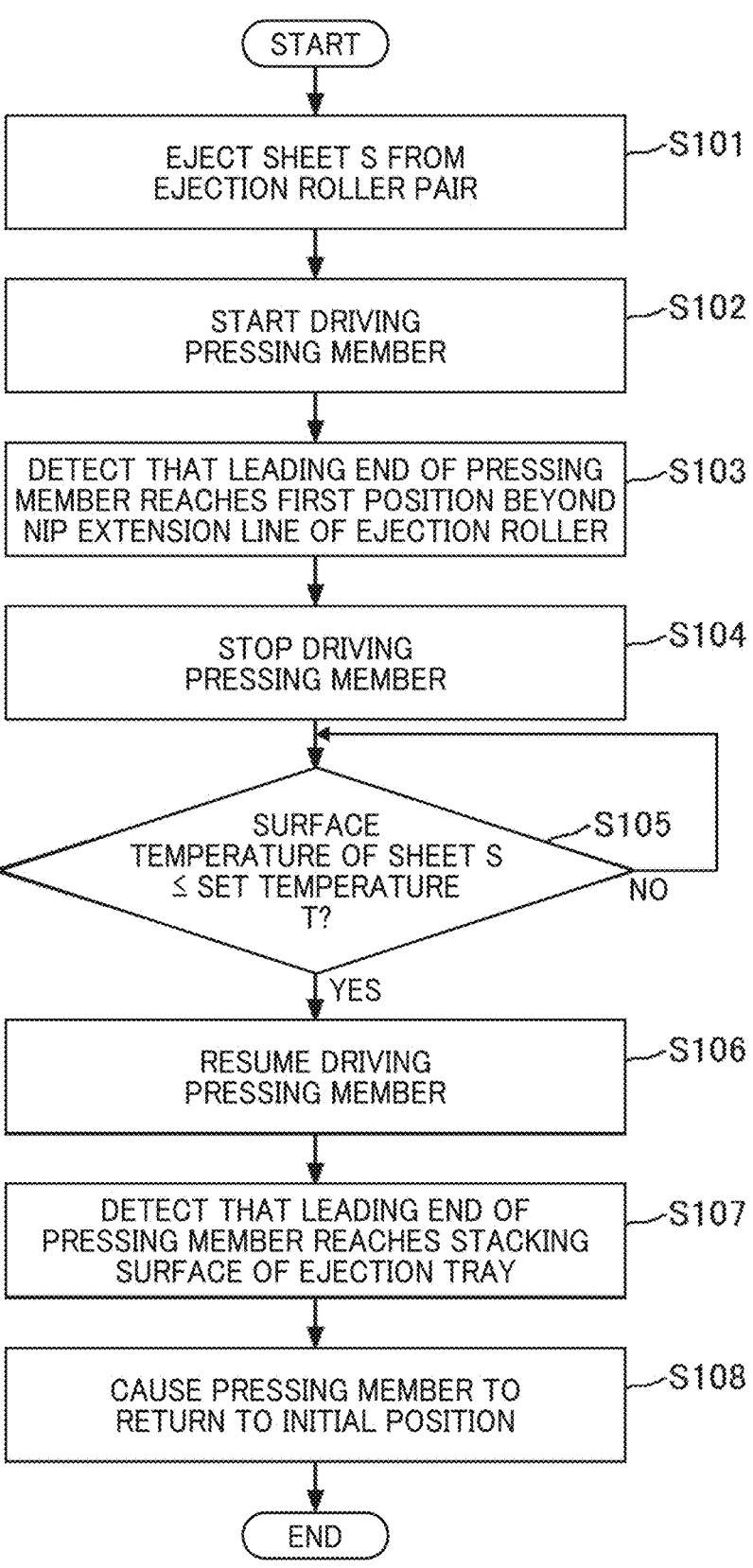
FIG. 31 is a flowchart of the operation control of the pressing member in accordance with the surface temperature of a sheet.

FIG. 31 is a flowchart of the operation control of the pressing member in accordance with the surface temperature of a lamination sheet.

Figure 32:
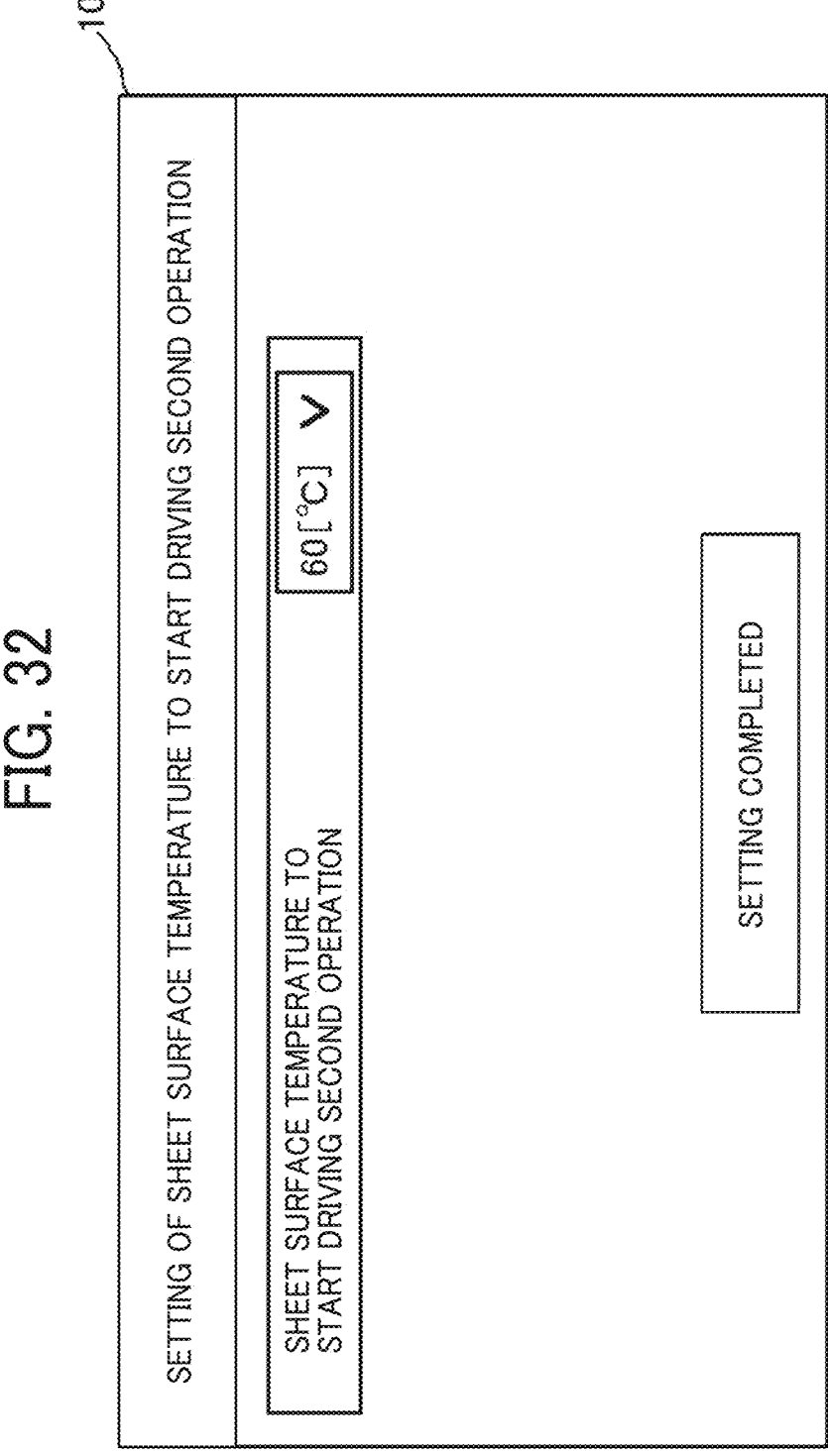
FIG. 32 is a diagram illustrating an example of a control panel for setting the surface temperature of a sheet for starting the second operation.

FIG. 32 is a diagram illustrating an example of a control panel for setting the surface temperature of a sheet for starting the second operation.

A description is given of the process of the operation control of the pressing member, with reference to FIG. 31.

First, a controller 50 of the sheet laminator 200 causes the sheet ejection roller pair 121 to eject the lamination sheet S in step S101. Then, the controller 50 causes a driving motor 52 to start driving the pressing member 124 in step S102. Then, the controller 50 causes the pressing member 124 to move the leading end of the pressing member 124 to the first position beyond the extension line L of the nip region of the sheet ejection roller pair 121 in the first operation, in step S103. Subsequently, the controller 50 causes the driving motor 52 to stop driving the pressing member 124 in step S104.

Then, the controller 50 of the sheet laminator 200 determines whether the surface temperature of the lamination sheet S is equal to or smaller than a set temperature T in step S105. When the controller 50 of the sheet laminator 200 determines that the surface temperature of the lamination sheet S is equal to or smaller than the set temperature T (YES in step S105), the controller 50 causes the driving motor 52 to restart driving the pressing member 124 in step S106. In contrast, when the controller 50 of the sheet laminator 200 determines that the surface temperature of the lamination sheet S is greater than the set temperature T (NO in step S105), the state in which the driving of the pressing member 124 is stopped is remained until the surface temperature of the lamination sheet S becomes equal to or smaller than the set temperature T (YES in step S105).

Then, the controller 50 causes the leading end of the pressing member 124 to move toward the stacking face 104b of the sheet ejection tray 104 to press the lamination sheet S against the stacking face 104b of the sheet ejection tray 104 in the second operation, in step S107. Then, the controller 50 causes the pressing member 124 to return to the initial position, in step S108.

As described above, the pressing member 124 subjected to the first operation does not perform (holds) the second operation before the surface temperature of the lamination sheet S stacked on the stacking face 104b of the sheet ejection tray 104 reaches the temperature equal to or smaller than the given set temperature T. As a result, the pressing member 124 is pressed against the stacking face 104b of the sheet ejection tray 104 with the glue applied between the two sheets P1 and P2 of the lamination sheets S being cured. Accordingly, the lamination sheet S is prevented from having the pressing mark (recessed mark) formed on the lamination sheet S.

The temperature detection sensor 192 is an example of a temperature detector. The temperature detector may be, for example, a thermistor.

Further, it is desired that the set temperature T can be set to any value by the user, in step S105. As illustrated in FIG. 32, it is desired that, for example, the control panel 10 displays the surface temperature of the lamination sheet S in the second operation so that the user can set the surface temperature to any value.

(3) Setting Standby Time

Figure 33:
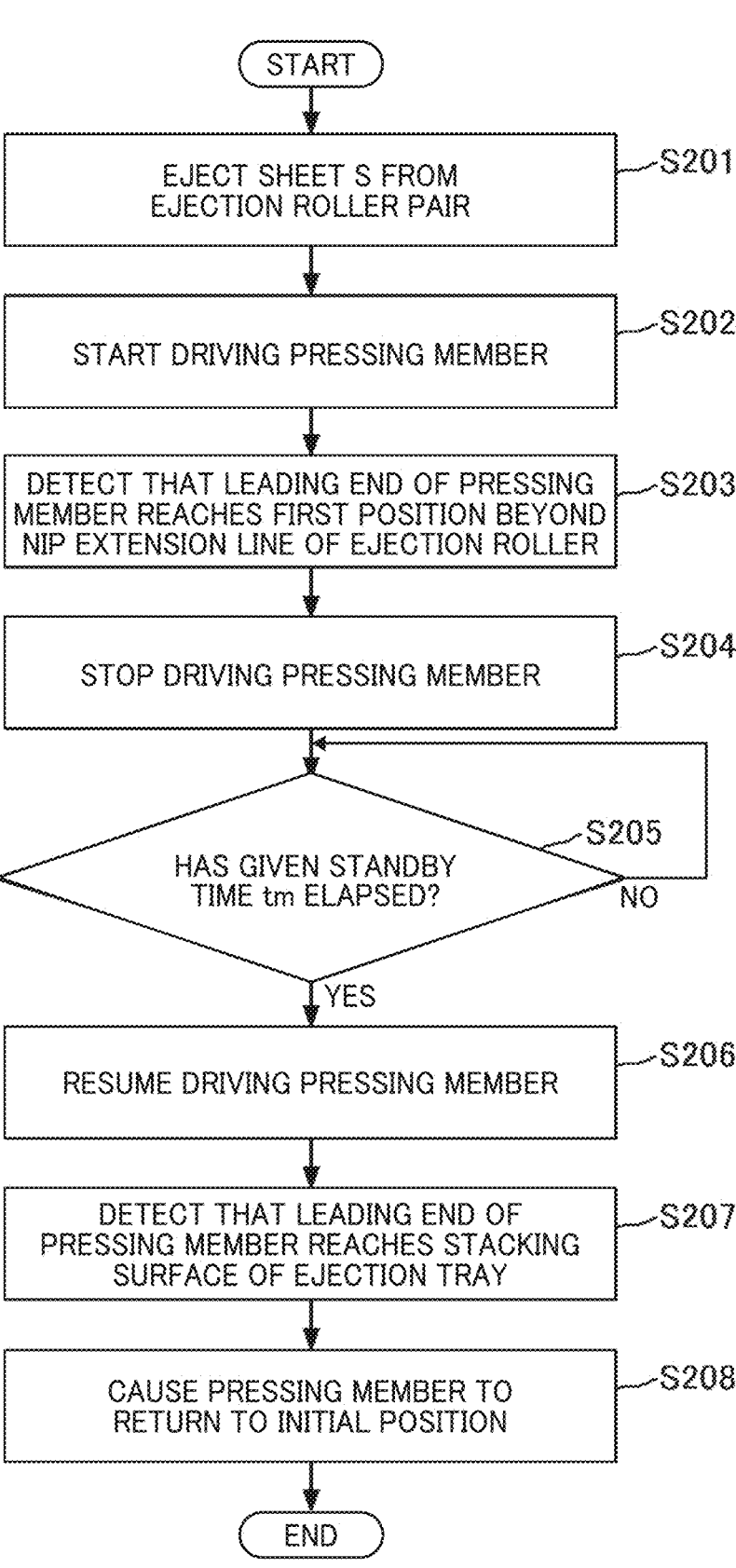
FIG. 33 is a flowchart of the operation control of the pressing member with a standby time.

FIG. 33 is a flowchart of the operation control of the pressing member 124 with a standby time.

A description is given of the process of the operation control of the pressing member, with reference to FIG. 33.

First, the controller 50 of the sheet laminator 200 causes the sheet ejection roller pair 121 to eject the lamination sheet S in step S201. Then, the controller 50 causes the driving motor 52 to start driving the pressing member 124 in step S202. Then, the controller 50 causes the pressing member 124 to move the leading end of the pressing member 124 to the first position beyond the extension line L of the nip region of the sheet ejection roller pair 121 in the first operation, in step S203. Subsequently, the controller 50 causes the driving motor 52 to stop driving the pressing member 124 in step S204.

Then, the controller 50 of the sheet laminator 200 determines whether a given standby time "tm" has elapsed since the stop of the driving of the pressing member 124, in step S205. When the controller 50 of the sheet laminator 200 determines that the given standby time "tm" has elapsed (YES in step S205), the controller 50 causes the driving motor 52 to resume driving the pressing member 124, in step S206. In contrast, when the controller 50 of the sheet laminator 200 determines that the given standby time "tm" has not elapsed (NO in step S205), the state in which the driving of the pressing member 124 is stopped is remained until the given standby time "tm" elapses (YES in step S205).

Then, the controller 50 causes the pressing member 124 to move the leading end of the pressing member 124 to the stacking face 104b of the sheet ejection tray 104 to press the lamination sheet S against the stacking face 104b in the second operation, in step S207. Then, the controller 50 causes the pressing member 124 to return to the initial position, in step S208.

As described above, the pressing member 124 subjected to the first operation does not perform (holds) the second operation before the given standby time "tm" elapses. As a result, the pressing member 124 is pressed against the stacking face 104*b* of the sheet ejection tray 104 with the glue applied between the two sheets P1 and P2 of the lamination sheets S being cured. Accordingly, the lamination sheet S is prevented from having the pressing mark (recessed mark) formed on the lamination sheet S.

Alternatively, the given standby time "tm" may be set to any value by the user, in step S205. For example, the standby time "tm" may be set to any value by the user via, for example, the control panel 10.

(4) Changing Movable Range

Figure 34A:
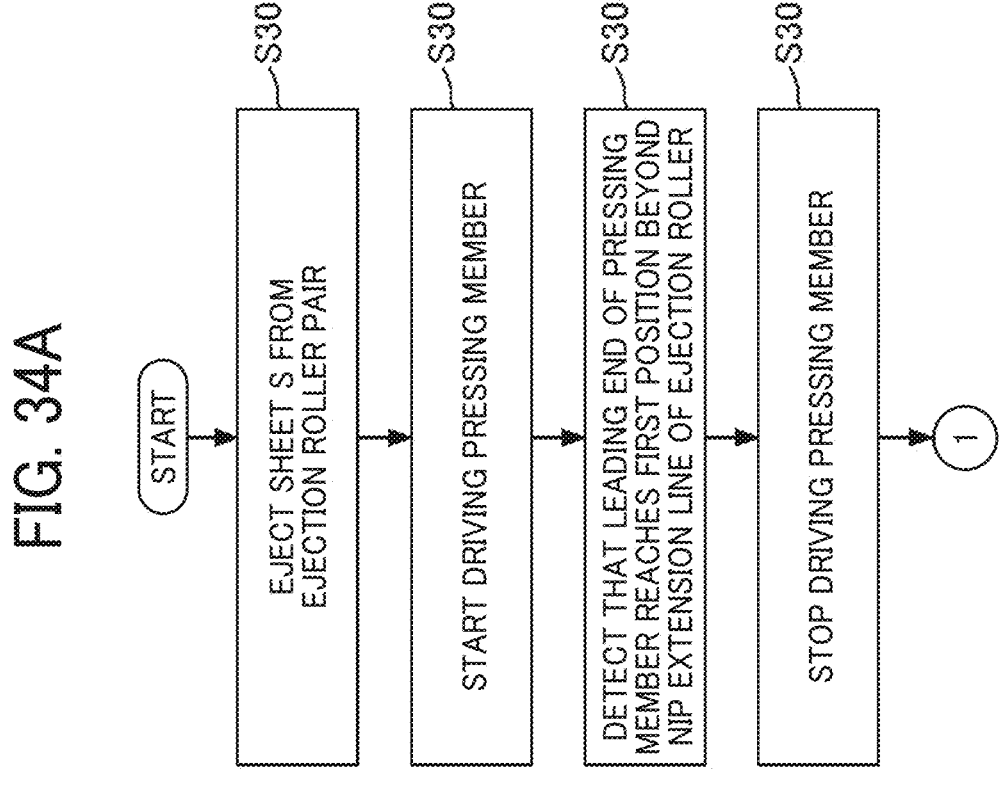
FIG. 34A is the first half of a flowchart of the control for changing the movable range of the pressing member depending on the thickness of a sheet.

FIG. 34A is the first half of a flowchart of the control for changing the movable range (driving distance) of the pressing member depending on the thickness of the lamination sheet S.

Figure 34B:
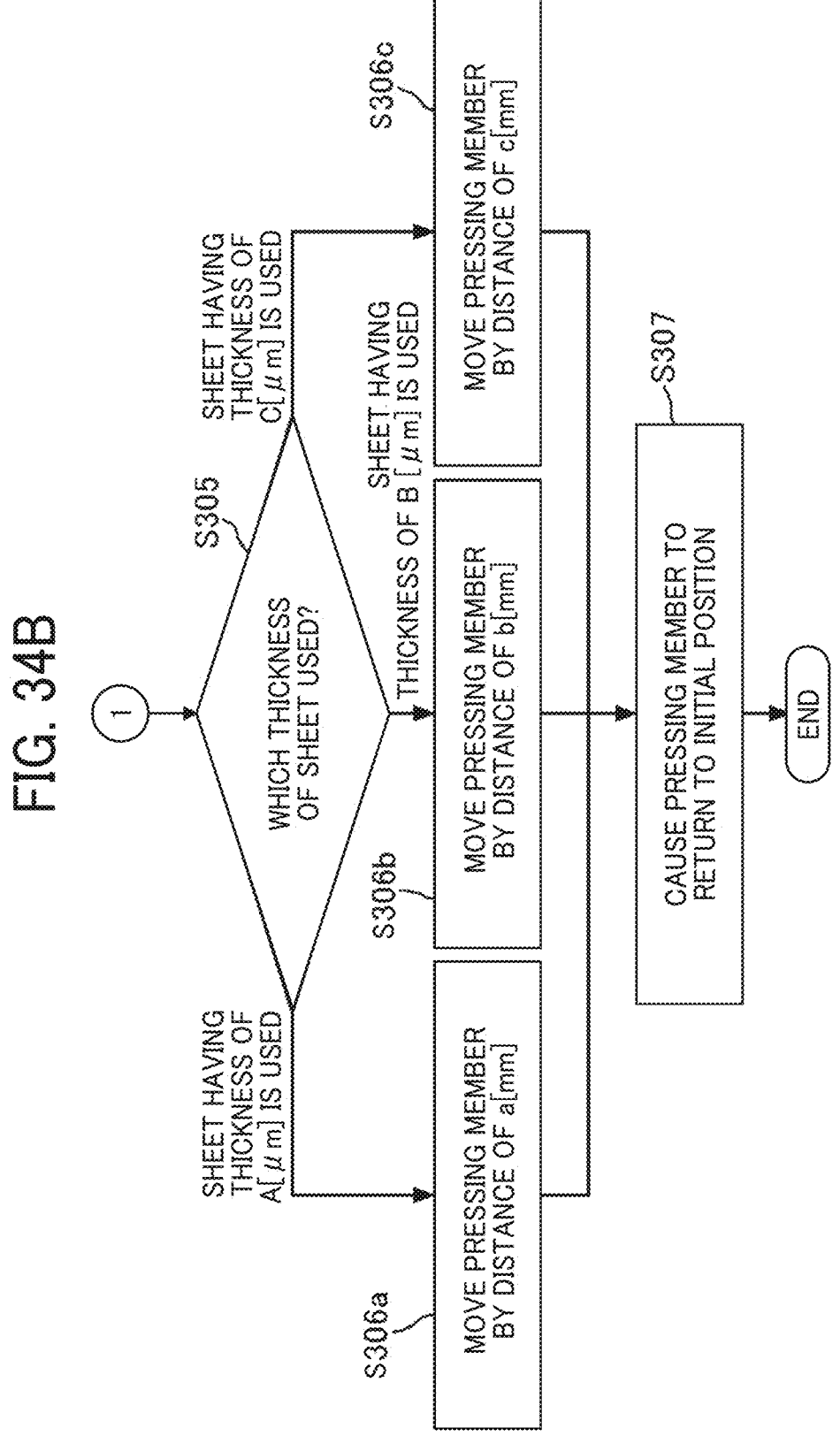
FIG. 34B is the second half of the flowchart of the control of FIG. 34A.

FIG. 34B is the second half of the flowchart of the control of FIG. 34A.

A description is given of the process of the operation control of the pressing member, with reference to the flowchart of FIGS. 34A and 34B.

First, the controller 50 of the sheet laminator 200 causes the sheet ejection roller pair 121 to eject the lamination sheet S in step S301. Then, the controller 50 causes the driving motor 52 to start driving the pressing member 124 in step S302. Then, the controller 50 causes the pressing member 124 to move the leading end of the pressing member 124 to the first position beyond the extension line L of the nip region of the sheet ejection roller pair 121 in the first operation, in step 303. Subsequently, the controller 50 causes the driving motor 52 to stop driving the pressing member 124 in step S304.

Then, the controller 50 of the sheet laminator 200 causes the pressing member 124 to change the movable range (driving distance) in accordance with the thickness of the lamination sheet S during the process, in step S305. For example, when the lamination sheet S has a thickness of A (μm), the process proceeds to step S306*a*. In step S306*a*, the controller 50 causes the pressing member 124 to move the leading end of the pressing member 124 by a (mm) in the direction perpendicular to the stacking face 104*b* of the sheet ejection tray 104.

On the other hand, when the lamination sheet S has a thickness of B (μm), the process proceeds to step S306*b*, and the controller 50 causes the pressing member 124 to move the leading end of the pressing member 124 by b (mm) in the direction perpendicular to the stacking face 104*b* of the sheet ejection tray 104, in step S306*b*.

Further, when the lamination sheet S has a thickness of C (μm), the process proceeds to step S306*c*, and the controller 50 causes the pressing member 124 to move the leading end of the pressing member 124 by c (mm) in the direction perpendicular to the stacking face 104*b* of the sheet ejection tray 104, in step S306*c*.

Then, the controller 50 causes the pressing member 124 to return to the initial position, in step S307.

As described above, the pressing member 124 changes the movable range (driving distance) depending on the thicknesses of the sheets S to be used. Due to such a configuration, the pressing member 124 can press the lamination sheet S against the stacking face 104*b* with an appropriate pressing force. As a result, the configuration of the sheet laminator according to the prevent embodiment can prevent the lamination sheet S from having the pressing mark (recessed mark) on the lamination sheet S.

Figure 35:
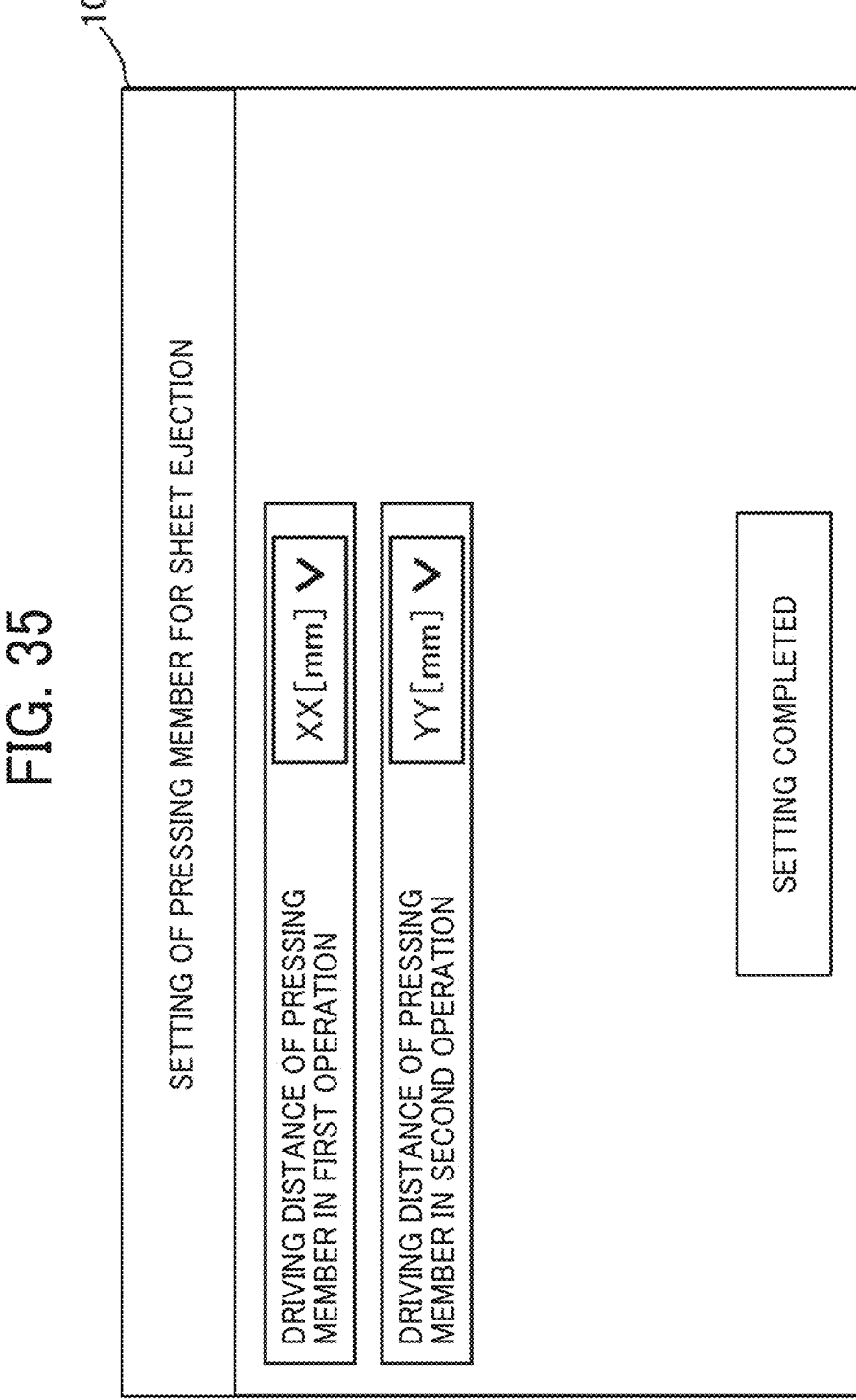
FIG. 35 is a diagram illustrating an example of the control panel for setting the movable range (driving distance) of the pressing member.

FIG. 35 is a diagram illustrating an example of the control panel for setting the movable range (driving distance) of the pressing member.

It is desired that the movable range (driving distance) of the pressing member 124 can be set to any value using, for example, the control panel 10. As a result, the movable range (driving distance) can be appropriately set in accordance with the specification or state of the sheet laminator and the specification or state of the lamination sheet S.

FIG. 36 is a diagram illustrating an example of the screen of the control panel for setting a drive timing of the pressing member.

It is also desired that the drive timing of the pressing member 124 is set to any value via, for example, the control panel 10. As a result, the drive timing of the pressing member 124 can be appropriately set in accordance with the specification or state of the sheet laminator and the specification or state of the lamination sheet S.

Figure 37:
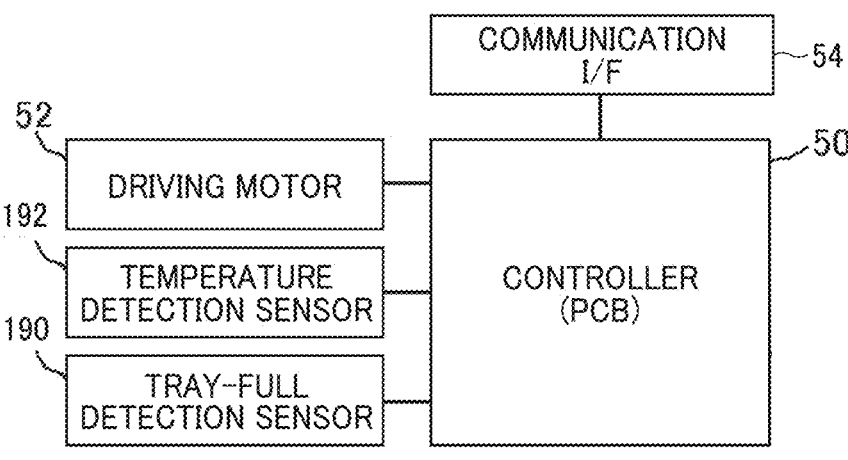
FIG. 37 is a diagram illustrating a hardware configuration of the sheet laminator.

FIG. 37 is a diagram illustrating a hardware configuration of the sheet laminator. The sheet laminator includes the controller (Process Control Block, PCB) 50 including control chips and control software (application) controls the driving motor 52 that drives the pressing member 124.

The controller (PCB) 50 can reflect, for the control, the results of the tray-full detection sensor 190 and the temperature detection sensor 192. Further, the controller 50 can reflect, for the control, the result from communication with the control panel 10, and a controller 300*a* or 400*a* of the image forming apparatus 300 or 400 via a communication interface (I/F) 54.

(5) Second Operation of Pressing Member

FIGS. 38A, 38B and 38C are schematic views of the pressing member in the second FIG. 38A is a schematic view of the pressing member in the state at the start of the second operation of the pressing member.

FIG. 38B is a schematic view of the pressing member in the state during (at the standby state of) the second operation of the pressing member.

FIG. 38C is a schematic view of the pressing member in the state at completion of the second operation of the pressing member.

Then, as illustrated in FIG. 38A, the leading end of the pressing member 124 is moved to press the lamination sheet S against the stacking face 104*b* in the second operation. Then, as illustrated in FIG. 38B, the pressing member 124 continues to press the lamination sheet S stacked on the stacking face 104*b* of the sheet ejection tray 104 until the sheet ejection roller pair 121 starts to eject a subsequent lamination sheet S'.

Then, as illustrated in FIG. 38C, at the timing that the sheet ejection roller pair 121 starts to eject the subsequent lamination sheet S', the pressing member 124 is returned to the initial position. As described above, the pressing member 124 continues to press the lamination sheet S stacked on the stacking face 104*b* of the sheet ejection tray 104 until the sheet ejection roller pair 121 ejects the subsequent lamination sheet S'. Accordingly, this configuration of the sheet laminator can prevent from changing the order of ejection of lamination sheets S and contacting the subsequent lamination sheet S' ejected from the sheet ejection roller pair 121 to the preceding lamination sheet S preceding the subsequent lamination sheet S' and stacked in advance on the stacking face 104*b* of the sheet ejection tray 104.

(6) Drive Torque Limit of Pressing Member

It is desired that the driving motor 52 of the pressing member 124 includes a torque limiter (an overload protection device) to stop the driving of the pressing member 124 when a load equal to or greater than a given amount is applied. As a result, the configuration of the sheet laminator according to the present embodiment can more effectively prevent generation of the pressing mark (recessed mark) on the lamination sheet S or damage on the lamination sheet due to the pressing member 124 by excessively pressing the lamination sheet S.

Some embodiments of the present disclosure have been described in detail above. The above-described embodiments are examples and can be modified within the scope not departing from the gist of the present disclosure.

A description is now given of some aspects of the present disclosure.

Aspect 1

In Aspect 1, a sheet laminator includes a sheet ejection roller pair, a sheet ejection tray, a driving unit, and a presser. The sheet ejection roller pair ejects a two-ply sheet downwardly in a vertical direction, the two-ply sheet subjected to a sheet laminating operation in which heat and pressure are applied to the two-ply sheet with a sheet medium. The sheet ejection tray is disposed downstream from the sheet ejection roller pair in the vertical direction. The sheet ejection tray has a receiving face and a stacking face. The receiving face receives the two-ply sheet ejected by the sheet ejection roller pair in a standing state. The stacking face is obliquely disposed facing the receiving face. The presser is driven by the driving unit to move the two-ply sheet on the receiving face, and press the two-ply sheet onto the stacking face. The sheet ejection roller pair has a nip region extending in an extension line intersecting with the stacking face of the sheet ejection tray when viewed from a horizontal direction orthogonal to the vertical direction. The presser has a leading end in a conveyance direction of the two-ply sheet. The presser performs a first operation and a second operation, and temporarily stop between the first operation and the second operation. The first operation is to move the leading end of the presser from the receiving face toward the stacking face to a position beyond the extension line, and stack the two-ply sheet on the stacking face. The second operation is to move the leading end of the presser from the position, and press the two-ply sheet against the stacking face.

Aspect 2

In Aspect 2, a sheet laminator includes a sheet ejection roller pair, a sheet ejection tray, a driving unit, and a presser. The sheet ejection roller pair ejects a two-ply sheet downwardly in a vertical direction, the two-ply sheet subjected to a sheet laminating operation in which heat and pressure are applied to the two-ply sheet with a sheet medium. The sheet ejection tray is disposed downstream from the sheet ejection roller pair in the vertical direction. The sheet ejection tray has a receiving face and stacking face. The receiving face receives the two-ply sheet ejected by the sheet ejection roller pair in a standing state. The stacking face is obliquely disposed facing the receiving face. The presser is driven by the driving unit to move the two-ply sheet on the receiving face, and press the two-ply sheet onto the stacking face. The sheet ejection roller pair has a nip region extending in an extension line intersecting with the stacking face of the sheet ejection tray when viewed from a horizontal direction orthogonal to the vertical direction. The presser has a leading end in a conveyance direction of the two-ply sheet.

The presser performs a first operation at an operation speed and a second operation at an operation speed slower than the operation speed of the first operation. The first operation is to move the leading end of the presser from the receiving face toward the stacking face to a position beyond the extension line, and stack the two-ply sheet on the stacking face. The second operation is to move the leading end of the presser from the position, and press the two-ply sheet against the stacking face.

Aspect 3

In Aspect 3, the sheet laminator according to Aspect 1 or 2 further includes a tray-full detector to detect whether a stacking level of the two-ply sheets on the stacking face reaches an upper limit value. The tray-full detector performs a sheet full detection while the presser presses the two-ply sheet against the stacking face of the sheet ejection tray.

Aspect 4

In Aspect 4, the sheet laminator according to any one of Aspects 1 to 3 further includes a temperature detector to detect a surface temperature of the two-ply sheet. The presser performs the second operation when the surface temperature of the two-ply sheet reaches a temperature equal to or smaller than a given set temperature, after the first operation.

Aspect 5

In Aspect 5, in the sheet laminator according to Aspect 4, the set temperature is settable to any value.

Aspect 6

In Aspect 6, in the sheet laminator according to any one of Aspects 1 to 5, the presser performs the second operation when a given standby time has elapsed after the first operation.

Aspect 7

In Aspect 7, in the sheet laminator according to any one of Aspects 1 to 6, the presser presses the two-ply sheet on the stacking face of the sheet ejection tray until ejection of a second two-ply sheet is started.

Aspect 8

In Aspect 8, in the sheet laminator according to any one of Aspects 1 to 7, the presser has a movable range settable depending on a thickness of the two-ply sheet.

Aspect 9

In Aspect 9, in the sheet laminator according to Aspect 8, the movable range of the presser is settable to any value.

Aspect 10

In Aspect 10, in the sheet laminator according to any one of Aspects 1 to 9, the presser performs the first movement and the second movement at respective timing settable to any values.

Aspect 11

In Aspect 11, the sheet laminator according to any one of Aspects 1 to 10 further includes an air blower downstream from the sheet ejection roller pair in the conveyance direction of the two-ply sheet, the air blower configured to blow air to cool the two-ply sheet ejected by the sheet ejection roller pair.

Aspect 12

In Aspect 12, in the sheet laminator according to any one of Aspects 1 to 11, the driving unit stops driving the presser when a load amount equal to or greater than a given amount is applied to the presser.

Aspect 13

In Aspect 13, an image forming system includes the sheet laminator according to any one of Aspects 1 to 12, and an image forming apparatus to form an image on an inner sheet to be conveyed to the sheet laminator.

Aspect 14

In Aspect 14, a sheet laminator includes a sheet ejection roller pair, a sheet ejection tray, a presser, and circuitry. The sheet ejection roller pair ejects a two-ply sheet downwardly along an extension line of a nip region in a vertical direction, the two-ply sheet subjected to a sheet laminating operation in which heat and pressure are applied to the two-ply sheet with a sheet medium. The sheet ejection tray is disposed downstream from the sheet ejection roller pair in the vertical direction. The sheet ejection tray has a receiving face to receive the two-ply sheet ejected from the sheet ejection roller pair and standing in the sheet ejection tray, and a stacking face facing the receiving face and inclined with respect to the vertical direction. The presser has a leading end to move the two-ply sheet on the receiving face of the sheet ejection tray toward the stacking face of the sheet ejection tray, and press the two-ply sheet onto the stacking face of the sheet ejection tray. The circuitry is to perform a first operation to move the leading end of the presser from the receiving face of the sheet ejection tray to an intermediate position beyond the extension line and before the stacking face of the sheet ejection tray to stack the two-ply sheet on the stacking face of the sheet ejection tray, perform a second operation to move the leading end of the presser from the intermediate position to the stacking face of the sheet ejection tray, and press the two-ply sheet against the stacking face of the sheet ejection tray with the leading end of the presser.

Aspect 15

In Aspect 15, in the sheet laminator according to Aspect 14, the extension line of the nip region of the sheet ejection roller pair intersects with the stacking face of the sheet ejection tray when viewed from a horizontal direction orthogonal to the vertical direction.

Aspect 16

In Aspect 16, in the sheet laminator according to Aspect 14, the circuitry is further to temporarily stop the movement of the presser between the first operation and the second

Aspect 17

In Aspect 17, in the sheet laminator according to Aspect 14, the circuitry is further to perform the first operation to move the presser at a first speed, and perform the second operation to move the presser at a second speed slower than the first speed in the first operation.

Aspect 18

In Aspect 18, the sheet laminator according to Aspect 14 further includes a tray-full detector to detect a stacking level of the two-ply sheets on the stacking face of the sheet ejection tray reaching an upper limit value as a tray full detection, and perform the tray full detection while the presser presses the two-ply sheet against the stacking face of the sheet ejection tray.

Aspect 19

In Aspect 19, the sheet laminator according to Aspect 14 further includes a temperature detector to detect a surface temperature of the two-ply sheet. The circuitry is further to perform the second operation when the surface temperature of the two-ply sheet reaches a temperature smaller than a given set temperature, after the first operation.

Aspect 20

In Aspect 20, in the sheet laminator according to Aspect 19, the given set temperature is settable via an input device.

Aspect 21

In Aspect 21, in the sheet laminator according to Aspect 14, the circuitry is further to perform the second operation in response to an elapse of a given standby time after the first operation.

Aspect 22

In Aspect 22, in the sheet laminator according to Aspect 14, the circuitry is further to cause the presser to press the two-ply sheet on the stacking face of the sheet ejection tray until ejection of a second two-ply sheet is started.

Aspect 23

In Aspect 23, in the sheet laminator according to Aspect 14, the presser has a movable range settable depending on a thickness of the two-ply sheet set via an input device.

Aspect 24

In Aspect 24, in the sheet laminator according to Aspect 23, the movable range of the presser is settable to any value via the input device.

Aspect 25

In Aspect 25, in the sheet laminator according to Aspect 14, a timing to perform the first operation and a timing to perform the second operation are settable to any values via an input device.

Aspect 26

In Aspect 26, the sheet laminator according to claim 14 further includes an air blower downstream from the sheet ejection roller pair in a conveyance direction of the two-ply sheet, the air blower to blow air to cool the two-ply sheet ejected from the sheet ejection roller pair.

Aspect 27

In Aspect 27, in the sheet laminator according to Aspect 14, the circuitry is further to stop driving the presser when a load amount equal to or greater than a given amount is applied to the presser.

Aspect 28

In Aspect 28, an image forming system includes the sheet laminator according to Aspect 14, and an image forming apparatus to form an image on an inner sheet (P) to be conveyed to the sheet laminator.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet laminator comprising:
a sheet ejection roller pair to eject a two-ply sheet downwardly along an extension line of a nip region in a vertical direction, the two-ply sheet subjected to a sheet laminating operation in which heat and pressure are applied to the two-ply sheet with a sheet medium;
a sheet ejection tray downstream from the sheet ejection roller pair in the vertical direction,
the sheet ejection tray having:
a receiving face to receive the two-ply sheet ejected from the sheet ejection roller pair and standing in the sheet ejection tray; and a stacking face facing the receiving face and inclined with respect to the vertical direction;
a presser having a leading end to:
move the two-ply sheet on the receiving face toward the stacking face of the sheet ejection tray; and
press the two-ply sheet onto the stacking face of the sheet ejection tray; and circuitry configured to:
perform a first operation to move the leading end of the presser from the receiving face of the sheet ejection tray to an intermediate position beyond the extension line and before the stacking face of the sheet ejection tray to stack the two-ply sheet on the stacking face of the sheet ejection tray; and
perform a second operation to:
move the leading end of the presser from the intermediate position to the stacking face of the sheet ejection tray; and
press the two-ply sheet against the stacking face of the sheet ejection tray with the leading end of the presser.

2. The sheet laminator according to claim 1,
wherein the extension line of the nip region of the sheet ejection roller pair intersects with the stacking face of the sheet ejection tray when viewed from a horizontal direction orthogonal to the vertical direction.

3. The sheet laminator according to claim 1,
wherein the circuitry is further configured to temporarily stop the movement of the presser between the first operation and the second operation.

4. The sheet laminator according to claim 1,
wherein the circuitry is further configured to:
perform the first operation to move the presser at a first speed; and
perform the second operation to move the presser at a second speed slower than the first speed in the first operation.

5. The sheet laminator according to claim 1, further comprising:
a tray-full detector to:
detect a stacking level of the two-ply sheets on the stacking face of the sheet ejection tray reaching an upper limit value as a tray full detection; and
perform the tray full detection while the presser presses the two-ply sheet against the stacking face of the sheet ejection tray.

6. The sheet laminator according to claim 1, further comprising a temperature detector to detect a surface temperature of the two-ply sheet,
wherein the circuitry is further configured to perform the second operation when the surface temperature of the two-ply sheet reaches a temperature smaller than a given set temperature, after the first operation.

7. The sheet laminator according to claim 6,
wherein the given set temperature is settable via an input device.

8. The sheet laminator according to claim 1,
wherein the circuitry is further configured to perform the second operation in response to an elapse of a given standby time after the first operation.

9. The sheet laminator according to claim 1,
wherein the circuitry is further configured to cause the presser to press the two-ply sheet on the stacking face of the sheet ejection tray until ejection of a second two-ply sheet is started.

10. The sheet laminator according to claim 1, wherein the presser has a movable range settable depending on a thickness of the two-ply sheet set via an input device.

11. The sheet laminator according to claim 10, wherein the movable range of the presser is settable to any value via the input device.

12. The sheet laminator according to claim 1, wherein a timing to perform the first operation and a timing to perform the second operation are settable to any values via an input device.

13. The sheet laminator according to claim 1, further comprising an air blower downstream from the sheet ejection roller pair in the conveyance direction of the two-ply sheet, the air blower to blow air to cool the two-ply sheet ejected from the sheet ejection roller pair.

14. The sheet laminator according to claim 1, wherein the circuitry is further configured to stop driving the presser when a load amount equal to or greater than a given amount is applied to the presser.

15. An image forming system comprising:
the sheet laminator according to claim 1; and
an image forming apparatus to form an image on an inner sheet to be conveyed to the sheet laminator.

* * * * *